(12) United States Patent
Geng et al.

(10) Patent No.: US 10,269,478 B2
(45) Date of Patent: Apr. 23, 2019

(54) APPARATUS AND METHODS FOR CHANGING THE MAGNETISATION OF A SUPERCONDUCTOR

(71) Applicant: MAGNIFYE LIMITED, Cambridge, Cambridgeshire (GB)

(72) Inventors: Jianzhao Geng, Cambridge (GB); Timothy Arthur Coombs, Cambridge (GB)

(73) Assignee: MAGNIFYE LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 15/746,197

(22) PCT Filed: May 23, 2016

(86) PCT No.: PCT/GB2016/051484
§ 371 (c)(1),
(2) Date: Jan. 19, 2018

(87) PCT Pub. No.: WO2017/021674
PCT Pub. Date: Feb. 9, 2017

(65) Prior Publication Data
US 2018/0218818 A1    Aug. 2, 2018

(30) Foreign Application Priority Data
Jul. 31, 2015 (GB) .................... 1513597.3

(51) Int. Cl.
*H01F 6/00* (2006.01)
*H01F 6/06* (2006.01)
(52) U.S. Cl.
CPC .............. *H01F 6/006* (2013.01); *H01F 6/06* (2013.01)
(58) Field of Classification Search
CPC .................... H01F 6/00–6/06; H01B 12/00
See application file for complete search history.

(56) References Cited

U.S. PATENT DOCUMENTS 3,150,291 A * 9/1964 Laquer ................... H01F 6/005
257/E39.001
5,965,959 A * 10/1999 Gamble .................. H01F 6/005
307/113
(Continued)

FOREIGN PATENT DOCUMENTS

EP    1956614    8/2008
EP    2648013    10/2013

OTHER PUBLICATIONS

International Search Report for PCT/GB2016/051484, Completed by the European Patent Office dated Aug. 19, 2016, 4 Pages.
(Continued)

*Primary Examiner* — Colleen P Dunn
(74) *Attorney, Agent, or Firm* — Brooks Kushman P.C.

(57) ABSTRACT

A superconducting circuit having: a charging loop; a load loop including a superconductor; a superconducting connection which is simultaneously part of the charging loop and the load loop; and a controller to control a state of the connection between a first and second conductive states. In both the first and second states the connection is in a superconducting state, but a resistance or impedance of the superconducting connection is higher in the first conductive state than in the second conductive state such that the superconducting circuit is configured to induce flux flow between the charging loop and the load loop when the connection is its first conductive state, and inhibits flux flow between the charging loop and the load loop when the connection is its second conductive state; in particular wherein the superconducting connection operates in a flux flow regime in the first conductive state.

18 Claims, 11 Drawing Sheets

(56) References Cited

U.S. PATENT DOCUMENTS

| | | | | |
|---|---|---|---|---|
| 6,157,094 | A | * | 12/2000 | Gamble .................. H01F 6/005 307/113 |
| 7,606,019 | B2 | | 10/2009 | Spreiter et al. |
| 2008/0191823 | A1 | * | 8/2008 | Spreiter ............. G01R 33/3815 335/216 |
| 2013/0234815 | A1 | * | 9/2013 | Milward .................. H01F 6/00 335/216 |

OTHER PUBLICATIONS

Laquer et al. Physics Letters Jun. 1, 1966. vol. 21, No. 4, pp. 397-398, "An Automatic Superconducting Flux Pump".
Klundert et al. Cryogenics Apr. 1981, pp. 195-206, "Fully superconducting rectiifiers and fluxpumps Part 1: Realized methods for pumping flux".
Klundert et al. Cryogenics May 1981, pp. 267-277, "On fully superconducting rectifiers and fluxpumps. A review. Part 2: Commutation modes, characteristics and switches".
Hott et al. To be Published in A. Narlikar (Ed.) "Frontiers in Superconducting Materials", Springer Verlag, Berlin 2004, 70 Pages, "Superconducting Materials—A Topical Overview".

* cited by examiner

APPARATUS AND METHODS FOR CHANGING THE MAGNETISATION OF A SUPERCONDUCTOR

CROSS-REFERENCE TO RELATED APPLICATION

This application is the U.S. national phase of PCT Application No. PCT/GB2016/051484 filed on May 23, 2016, which claims priority to GB Patent Application No. 1513597.3 filed on Jul. 31, 2015, the disclosures of which are incorporated in their entirety by reference herein.

FIELD OF THE INVENTION

This invention generally relates to methods and devices for pumping flux to change the magnetisation of a superconductor.

BACKGROUND TO THE INVENTION

Thanks to developments in manufacturing high-$T_c$ superconductor coated-conductor superconducting tapes, high-$T_c$ superconducting (HTS) coils are gradually being more commonly used for magnets for example in MRI (magnetic resonance imaging), motor windings, and so forth. HTS coils can be powered by an external power source, or may operate in a persistent current mode. High-$T_c$ Superconducter (HTS) Coated Conductors (CCs) are ideal candidates for high field magnets use, because of the high critical field of high-$T_c$ superconductors as well as the good mechanical properties of the CCs. The wide application of CCs magnets is, however, impeded by the fact that they cannot work in persistent mode themselves. This is because, due flux creep in high-$T_c$ superconductors and joint resistance, current in the closed superconducting circuit suffers an inevitable decay. One way to solve the problem is to use an external power supply to operate the magnet, but thick current leads have to be used for transporting high current, which induces considerable heat loss. An alternative solution is to use a flux pump. Flux pumps are devices which can inject a direct current into a superconducting circuit without electrical contacts. These can help a superconducting magnet operate in real persistent current mode. Over decades, several flux pumps for low-$T_c$ superconductors have been achieved. The key point for these flux pumps is to drive part of the superconductor normal, either by heat or high magnetic field. An example of such a flux pump is described in H. L. Laquer, K. J. Carroll, and E. F. Hammel, Phys Lett. 21, 397(1966).

For high temperature ($T_c$) superconductors such as YBCO (yttrium barium copper oxide), it is difficult to use high field to drive it normal, due to its very high upper critical field. Using heat to drive a superconductor normal is also challenging for practical use, because of the low response speed as well as the heat loss. Recently, several HTS flux pumps based on a travelling magnetic wave have been successfully developed.

Classical flux pumps typically use two switches in which the switches are fully opened. That is the switches are sent normal in sequence as flux is drawn first into one loop and then the second destination loop. A general review of the prior art can be found in, e.g. L. J. M. van de Klundert and H. H. J ten Kate, Cryogenics 21, 195 (1981), and L. J. M. van de Klundert and H. H. J ten Kate, Cryogenics 21, 267 (1981).

However, as can be appreciated, there is a need for further improvement of superconducting flux pumps.

SUMMARY OF THE INVENTION

According to a first aspect of the invention there is therefore provided a method of pumping flux to change the magnetisation of a superconductor, the method comprising: forming a superconducting circuit, the circuit comprising: a first, charging loop having first and second charging loop connections; a second, load loop having first and second load loop connections respectively coupled to said first and second charging loop connections; and a bridge coupled across said first and second load loop connections; wherein at least a portion of said bridge is switchable between a first, lower impedance or conductive state and a second, higher impedance or resistive state; applying a magnetic field with an alternating magnetic field component to said charging loop, said alternating magnetic field component having a first magnetic field component direction during a first time interval during which current is induced in said charging loop in a first current direction and a second magnetic field component direction during a second time interval during which current is induced in said charging loop in a second, opposite current direction; and controlling said bridge in synchrony with said alternating magnetic field component such that, during said first time interval said bridge is in said higher impedance or resistive state and said induced current flows through said load loop, and during said second time interval said bridge is in said lower impedance or conductive state and said induced current flows through said conducting bridge.

Embodiments of the method are simple and straightforward to fabricate and be more readily incorporated into practical devices than previous flux pumps/methods.

In some preferred embodiments during the second time interval, a further current from the load loop flows through the conducting bridge in the same direction as the induced current from the charging loop. That is, in embodiments the bridge acts to enable a flux pump phase of the ac cycle followed by a flyback phase of the ac cycle, in the flyback phase the bridge carrying current from both the charging loop and the load loop (so that the load loop is not discharged by the second phase of the ac cycle).

To operate, the bridge merely needs to be switched between two different conductive states, more particularly a second state in which the bridge is generally conductive (or has a relatively lower impedance) and a first state in which the bridge (or a portion thereof) is generally resistive (or has a relatively higher impedance). Nonetheless in some preferred embodiments the system works best if the bridge is substantially superconducting in its second, conductive state.

In some preferred embodiments the bridge is switched between the conductive states by applying a magnetic field, more particularly by applying an ac magnetic field which is modulated between higher and lower amplitudes (in embodiments on and off) to switch a resistance or impedance of the bridge.

Thus in preferred embodiments the bridge comprises a superconductor, in particular HTS, and the bridge remains superconducting throughout operation of the method. (This is also true of the later described aspects and embodiments of the invention employing an applied ac magnetic field). This is achieved by using the ac magnetic field to induce a state of dynamic resistance in the bridge in which the applied field interacts with the applied field to resist current flow even though the superconductor remains superconducting. Typically this occurs when a (material dependent) threshold field (more particularly, field component perpendicular to the current flow direction) is applied, the resistance depending (substantially linearly) upon the ac frequency. The dynamic resistance may also be influenced by the current density in the superconductor (bridge), and superconductor structure and geometry. The choice of applied ac magnetic field given any particular material(s) and geometry is a matter of routine measurement and experimentation for the skilled person, specific to a particular implementation.

As the skilled person will understand, although a superconductor is generally considered to be lossless this is only true at DC (and, being precise, not even then)—with an AC current the superconductor operates in a flux flow regime in which changing magnetic flux interacts with the current to create a magnetisation loss. Thus although in embodiments of the invention the bridge may remain superconducting (typically it is not driven normal), the effective resistance of the superconductor is varied, in particular by applying an (AC) magnetic field. Thus in embodiments each of the first and second states of the bridge comprise superconducting states of the bridge; this is also true of the later described aspects and embodiments of the system, below.

In a related aspect the invention provides a superconducting flux pump comprising: a superconducting circuit, the circuit comprising: a first, charging loop having first and second charging loop connections; a second, load loop having first and second load loop connections respectively coupled to said first and second charging loop connections; and a bridge coupled across said first and second load loop connections; herein at least a portion of said bridge is switchable between a first, lower impedance or conductive state and a second, higher impedance or resistive state; a magnetic field generator to apply a magnetic field with an alternating magnetic field component to said charging loop, said alternating magnetic field component having a first magnetic field component direction during a first time interval during which current is induced in said charging loop in a first current direction, and a second magnetic field component direction during a second time interval during which current is induced in said charging loop in a second, opposite current direction; and a bridge controller to control said bridge in synchrony with said alternating magnetic field component such that, during said first time interval said bridge is in said second state and said induced current flows through said load loop, and during said second time interval said bridge is in said first state and said induced current flows through said conducting bridge.

As previously described, in all the aspects/embodiments described herein the bridge (or as referred to below, the superconducting connection) is preferably a superconducting bridge/connection which remains superconducting whichever conductive/resistive state it is in. In one approach, as previously described, the superconductor remains superconducting but an ac magnetic field is applied so that it exhibits a dynamic resistance.

In another approach the superconductor remains superconducting but is controlled to operate in the flux flow regime (by controlling the current through the superconductor and/or voltage/electric field across the superconductor). In broad terms, the flux flow regime is a regime in which flux vortices penetrate the superconductor (which may be a type II or in preferred embodiments a HTS superconductor). The macroscopic transport current density tends to move the flux lines perpendicular to the current flow, but vortex pinning sites such as defects and grain boundaries tend to inhibit this motion. In simplified terms, movement of the flux vortices results in energy dissipation which manifests itself as flux flow resistivity. The flux flow regime is accessed when greater than a flux flow critical current flows in the superconductor (not to be confused with the "conventional" critical current of a superconductor). The transition into the flux flow regime at the flux flow critical current is associated with a magnetic field (the irreversibility field) and an associated "irreversibility line", which describes the variation of this field with temperature and is characteristically concave (unlike the upper and lower critical fields), decreasing as temperature increases.

Some preferred aspects and embodiments of the invention exploit this flux flow resistivity in the operation of the described devices and methods. There is a particular synergy between this approach and the use of an HTS as the superconducting bridge/connection as HTS typically has many grain boundaries at which flux pinning may occur. In addition flux flow resistivity is a dominant mechanism for energy dissipation at the grain boundaries within HTS because of the high local electric fields which can be encountered in these regions.

This approach is preferably used in the aspects/embodiments of the invention below.

Thus in a related aspect of the present invention, there is provided a superconducting circuit comprising: a charging loop; a load loop comprising a superconductor; a superconducting connection which is simultaneously part of said charging loop and said load loop; and a controller to control a state of said connection between a first conductive state and a second conductive state, wherein a resistance of said connection is higher in said first conductive state than in said second conductive state; wherein said superconducting circuit is configured to induce flux flow between said charging loop and said load loop when said connection is in said first conductive state, and to inhibit flux flow between said charging loop and said load loop when said connection is in said second conductive state.

In preferred embodiments the superconducting connection is superconducting in both the first and second conductive states (and remains superconducting at all other times). In some preferred embodiments the controller controls the state of the connection by transformer coupling to the charging loop; more particularly in embodiments the charging loop includes a transformer secondary. Then the current in the charging loop may controlled by controlling the current (or voltage) on the transformer primary. Thus in embodiments the controller may comprise a current or voltage driver preferably configured (or configurable) to produce a (predetermined) drive waveform for the transformer primary to control the current (or voltage) through the superconducting connection bridge to switch the connection/bridge in and out of the flux flow regime whilst (always) maintaining the connection/bridge in a superconducting state.

In broad terms the controller/controlling controls the circuit so that the net current in the connection/bridge is sufficient to induce flux flow in the connection/bridge at one or more points in a cycle of operation of the circuit (between the two states), whilst maintaining the connection/bridge superconducting. In embodiments in broad terms the controller/controlling may control the circuit, more particularly the current ($i_p$) in the charging loop, so that the bridge voltage is approximately constant during the pumping phase(s) of the cycle.

As the skilled person will be aware, the particular current (or voltage) waveform will depend upon details of the materials employed, geometry of the circuit and the like. In some preferred embodiments the charging loop is a superconducting loop, for example an HTS loop, but this is not essential; the transformer primary circuit is typically not superconducting.

As outlined above, the inventors have realised that by controlling the conductive state of the superconducting connection (bridge) which is simultaneously part of the charging loop and the load loop, increasing or decreasing (or dynamically changing) the magnetisation of the superconductor of the load loop may be achieved by switching the conductive state of the connection between (at least) two states in which the connection has different conductivities.

It is to be noted that the resistance between opposite end points of the connection in the first conductive state (i.e. the higher-resistance state) is finite. In other words, the connection may act as a switch which is simultaneously part of the charging loop as well as the load loop. The connection may thereby be distinguished from a commonplace switch which is either open (infinite resistance) or closed. By contrast, in embodiments described herein, the connection is simultaneously part of the charging loop and the load loop, i.e. the connection simultaneously completes the charging loop as well as the load loop, and the resistance of the connection may be finite (and different) in both the first conductive state and the second conductive state.

We note that references throughout the specification to a resistance may be understood to also refer to impedance, for example an impedance of the connection.

As outlined above, by changing the resistance of the connection, i.e. controlling the conductive state of the connection between a first conductive state and a second conductive state, the magnetisation of the superconductor of the load loop may be controlled. This may be achieved whereby the first and second conductive states both have a finite resistance. Alternatively, the second conductive state may be a superconducting state while the connection has a finite resistance in the first conducting state.

In some embodiments, the connection (bridge) may be switched between a superconducting state and a state whereby flux flow is induced by an external magnetic field to increase a resistance of the connection (bridge). The flux flow itself may result in (an added) resistivity. The superconducting connection (bridge) may thereby not go normal.

In some embodiments, the connection (bridge) may have a nominal resistivity throughout and an additional resistivity may be present during the time when flux flow occurs.

Therefore, the connection (bridge) may, in some embodiments, be a variable impedance, for example, but not limited to a switched superconductor, a switched resistance or a variable inductance or capacitance.

Therefore, in a preferred embodiment of the superconducting circuit, the second conductive state is a superconducting state.

As will be further described below, the state of the connection may be controlled, for example, via an applied magnetic field. The superconducting state may thereby be obtained by removing the magnetic field applied to the connection. The controller may comprise a magnetic field generator, in particular an ac magnetic field generator for example as previously described, to control the state of the connection between a first conductive state and a second conductive state.

In some embodiments the superconducting connection comprises a superconductor adjacent a magnetic material such as a ferrite material. In embodiments this makes the superconducting connection more susceptible to a magnetic field; ferrite facilitates the use of a very high frequency magnetic field (for example with a frequency greater than 0.1, 1 or 10 MHz). In some embodiments of this and the previously and later described aspects of the invention the superconducting (bridge) may have a ferrite core and/or a ferrite over-layer. Additionally or alternatively a superconductor which is particularly susceptible to a magnetic field, such as BSCCO, may be employed.

It may be preferable to induce flux flow between the charging loop and the load loop during a first time interval, inhibiting flux flow between the charging loop and the load loop during a second time interval, and so on and so forth. This may allow, for example, for charging the superconductor up to 1 T, 2 T, 5 T, or even higher, by repeating the cycle of allowing flux flow and inhibiting flux flow between the charging loop and the load loop at certain time intervals.

Therefore, in a preferred embodiment of the superconducting circuit, the magnetic field generator is an AC magnetic field generator.

It will be appreciated that in this embodiment the current in the charging loop may be induced by a periodic function and may therefore reverse its direction between half-cycles. If the connection were still resistive, then the current may flow out of the load loop again, bypassing the connection. As a result, the current in the load loop may not increase after the first cycle. However, by allowing the connection to become superconducting (or to have a lower resistance) again when the charging loop current changes sign, the connection may short circuit the load loop. The load loop may thereby be bypassed and the current in the load loop may not be reduced by the charging loop current.

In a further preferred embodiment, the superconducting circuit further comprises a second magnetic field generator for inducing a changing magnetic flux in the charging loop. The second magnetic field generator may be, for example, a transformer, an electromagnet or a movable permanent magnet.

In a preferred embodiment of the superconducting circuit, the second magnetic field generator and the controller to control the state of the connection between the first conductive state and the second conductive state are integral to a single magnetic field generator unit. This may simplify the superconducting circuit design.

In a further preferred embodiment of the superconducting circuit, two or more of the charging loop, the load loop and the superconducting connection are integral to a single superconducting member. Flux may thereby, for example, be induced on a first side of the superconducting member, a field, for example an oscillating field, may be applied to a middle section of the superconducting member, and the current may then be induced on the second side of the superconducting member which is opposite the first side from the middle section of the superconducting member. This embodiment may allow for a simple design of the superconducting circuit and may be used to, for example, obtain a high magnetisation of 1 T, 2 T, 5 T or even higher on one side of the superconducting member.

In a related aspect of the present invention, there is provided a method for controlling the magnetisation of a superconductor, the method comprising: providing a charging loop, a load loop comprising a superconductor and a superconducting connection which is simultaneously part of said charging loop and said load loop; and controlling a state of said connection between a first conductive state and a second conductive state, wherein a resistance of said connection is higher in said first conductive state than in said second conductive state; wherein flux flow is induced between said charging loop and said load loop when said connection is in said first conductive state, and wherein flux flow between said charging loop and said load loop is inhibited when said connection is in said second conductive state; and wherein said magnetisation of said superconductor is controlled by controlling said flux flow between said charging loop and said load loop.

As outlined above, in general the connection (bridge) is superconducting in both the first and second states.

In embodiments the method/controller is configured to cyclically control a current in the superconducting connection such that during a first portion of a current cycle the current in the superconducting connection exceeds a first threshold level whilst staying below a second threshold level. Thus the method/controller maintains the superconducting connection in a flux flow regime in the first conductive state without the superconducting connection becoming normal. During a second portion of the current cycle the current in the superconducting connection is below the first threshold level to avoid the flux flow regime in the second conductive state. Thus a resistance of the superconducting connection comprises a flux flow resistance in the first conductive state and is substantially zero in said second conductive state.

Preferably a dc component of the current waveform is controlled to be substantially zero. This may be facilitated by fabricating the charging and/or load loop from a superconducting loop element electrically connected to the superconducting connection such that the superconducting connection bridges the superconducting loop element to form the charging and/or load loop. Then the finite resistance of the joints between either end of the superconducting connection and the superconducting loop element help to damp any non-zero dc component of said current waveform to substantially zero.

In embodiments the method/system uses a transformer in which the charging loop forms a secondary winding of the transformer. Then a current in a primary winding of the transformer may be controlled to control the current waveform in the charging loop.

It may be preferable to switch (or change) a dynamic conductance of the connection on and off at substantially the same frequency as the charging loop current is induced in the charging loop.

Therefore, in a preferred embodiment of the method, the controlling of the state of the connection comprises controlling a conductance of the connection dynamically by one or more of: controlling a frequency of a magnetic field applied to the connection; controlling a flux flow critical current of the connection, in particular by controlling a background field; controlling a length of the connection; and controlling a fraction of the connection to which a said magnetic field is applied and/or of which the flux flow critical current is controlled. Where it is not necessary to control the connection to maintain this within the flux flow regime the system may even control the temperature of the connection. Embodiments of the method may be used to dynamically control the conductance of the connection to thereby control the state of the connection between the first conducting state and the second conducting state.

It is important here to distinguish between the flux flow critical current, which determines whether or not the flux flow regime is accessed and the "normal" critical current (often merely referred to as simply the critical current), which is the current at which a superconductor is driven normal.

In principle the controllable superconducting bridge may be used independently of the above described flux pumping systems.

Thus in a further aspect the invention provides a superconducting switching device comprising: first and second electrical connections; a bridge coupled across said first and second electrical connections; an ac magnetic field generator to apply an ac magnetic field to at least a portion of said bridge switchable between a first, superconducting state and a second, resistive state; and a magnetic field modulator to modulate said ac magnetic field to switch said portion of said bridge between said superconducting and resistive states.

The invention further provides a method of changing the magnetisation of a superconductor, in particular a high-temperature superconductor, the method comprising: providing a superconducting circuit comprising a charging loop and a superconducting load loop, wherein the charging loop and load loop share a superconducting bridge comprising part of each loop; and controlling an alternating (ac) current circulating in said charging loop such that during a first portion of a cycle of said ac current the superconducting bridge is driven into a flux flow regime whilst remaining superconducting, and such that during a remainder portion of said cycle the superconducting bridge is superconducting with substantially zero resistance, such that during each said cycle a net magnetic flux flows across said bridge into said load loop.

Preferably the ac current in the charging loop has asymmetric positive and negative peaks and a substantially zero average value.

In a related aspect the invention further provides a flux pump comprising: a superconducting circuit comprising a charging loop and a superconducting load loop, wherein the charging loop and load loop share a superconducting bridge comprising part of each loop; and a controller to control an alternating (ac) current circulating in said charging loop such that during a first portion of a cycle of said ac current the superconducting bridge is driven into a flux flow regime whilst remaining superconducting, and such that during a remainder portion of said cycle the superconducting bridge is superconducting with substantially zero resistance, such that during each said cycle a net magnetic flux flows across said bridge into said load loop.

In a further related aspect of the invention a method, flux pump, device or circuit as described above may be employed as a superconducting energy storage and extraction device/system. Such a device/method employs a superconducting bridge or connection as described above, and a switching system (for example a controller) as described above to control the superconducting bridge or superconducting connection between superconducting states of different resistance or impedance (for example into and out of a flux flow regime), to extract energy stored in the magnetic field (of the load loop). Although preferably the superconducting bridge or superconducting connection remains superconducting during this process, embodiments of the technique may alternatively switch the bridge or connection between superconducting and non-superconducting states. In either case, when no charging current is driven in the charging loop (for example by transformer induction) the result is that flux flows out from the load loop across the superconducting bridge/connection into the charging loop: the procedure induces a flux flow across the bridge which changes the current in the charging loop. The changing flux, $d\Phi/dt$, induces an emf in the charging loop—that is switching the bridge/connection between its two states results in an ac emf in the charging loop, providing an ac power output powered by the energy stored in the magnetic field of the load loop.

Any of the previously described techniques may be employed to switch the superconducting bridge/connection between its different states. The ac power may be extracted/utilised in many ways, for example by a transformer coupling to the charging loop as previously described—the same transformer may be used to both store energy into the magnetic field of the charging loop and to extract stored energy from the loop in the form of an ac power output.

BRIEF DESCRIPTION OF THE DRAWINGS

These and other aspects of the invention will now be further described by way of example only, with reference to the accompanying Figures, wherein like numerals refer to like parts throughout, and in which.

DETAILED DESCRIPTION OF PREFERRED EMBODIMENTS

Figure 1A:
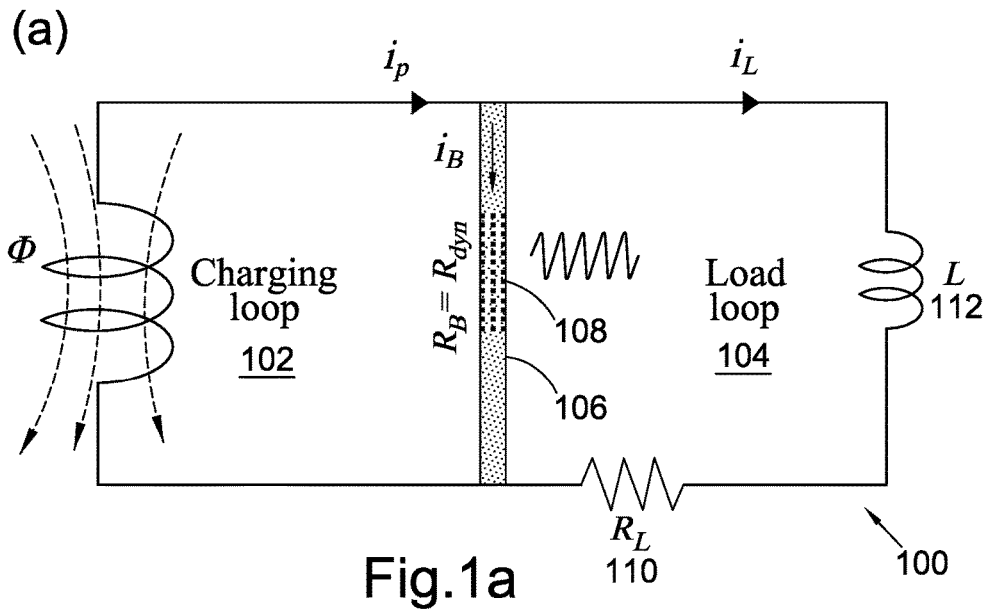
FIGS. 1a and 1b show schematics of the flux pumping mechanism according to embodiments of the present invention.

As outlined above, embodiments of the apparatus and methods described herein may be used to generate magnetic fields, in particular using a superconducting circuit to accumulate or reduce magnetic flux. Embodiments may be used to facilitate generation of high magnetic fields, for example in the range of 1 T, 2 T, 5 T or higher. A superconductor may be used to "store" the magnetic field. It will be understood that for a superconductor magnetic moment and magnetisation are synonymous.

Embodiments described herein may be used to magnetise or de-magnetise a superconductor, or for dynamically changing the magnetisation of a superconductor.

High-$T_c$ superconducting (HTS) magnets operating in persistent current mode suffer a current decay due to flux creep of superconductor and joint resistance. Flux pumps are able to inject a direct current into a superconducting circuit to compensate the current decay, without thermal loss caused by current leads. Embodiments described herein are particularly suitable for flux pumping in HTS coils. A mathematical model and experimental verifications are provided in the following description.

Some embodiments described herein may make use of flux flow being triggered when a superconductor is subjected to a perpendicular magnetic field.

Flux flow may occur when a superconductor is subject to a transport current above Jc, or a magnetic field above the irreversibility line. Alternatively flux flow may occur due to a combination of applied field and transport current. In the flux flow region the superconductor may still be regarded as superconducting. However, the motion of flux may lead to a loss and thus an implied resistance. This resistance may be leveraged in embodiments described herein.

Subjecting a type II or HTS superconductor transporting a direct current to an applied ac magnetic field with a component perpendicular to the current direction results in a transport loss. This can be thought of as a dynamic resistance, although the superconductor remains superconducting. The dynamic resistance for a superconducting tape may be calculated using the following expression (in a high field case the dynamic resistance is substantially independent of the magnitude of the transported current):

$$R_{dyn} = \frac{4alf}{I_{c0}}(B_a + cB_a^2) \tag{1}$$

where a is half the width of the tape, I is the length of the tape subjected to the field, f is the field frequency, $I_{c0}$ is the (normal) critical current of the tape, $B_a$ is the magnitude of applied field, and c is a factor describing the field-critical current relationship. For Bean's model, c is 0.

Once flux flow occurs the superconductor acquires a resistance. This is not an ohmic resistance per se, but is an equivalent resistance which occurs because as the current or the magnetic field is cycled, there is a hysteretic loss in the magnetisation with each cycle. Thus, as can be seen from equation 1, the loss and hence the equivalent resistance is a function of the number of cycles per second or the resistance.

FIG. 1 shows a schematic of a superconducting circuit 100 using the flux pump mechanism according to embodiments described herein.

In this example, an AC field is applied via a magnetic field generator 108 (e.g. an electromagnet) to the HTS tape, so that flux flows into the load loop 104 through the resistive bridge 106.

The principle used is that when flux flow is present the current induced in the charging loop 102, Ip, can flow directly into the load loop 104 (FIG. 1*a*) bypassing the bridge 106. Φ denotes the instantaneous value of flux injected into the charging loop 102.

However since the current in the charging loop 102 may be induced by a periodic function, at some later time the sense of the current Ip may reverse. If the bridge 106 were still resistive, then the current would flow out of the load loop 104 again bypassing the bridge 106 and the net effect would be that the load loop current, IL, would not increase after the first cycle. By allowing the bridge 106 to become superconducting again when Ip changes sign (FIG. 1*b*), the bridge 106 will short circuit the load loop 104 the load loop 104 will now be bypassed and IL will not be reduced by Ip. When the AC field is removed, the load loop 104 is shorted by the HTS tape 106.

Figure 1B:
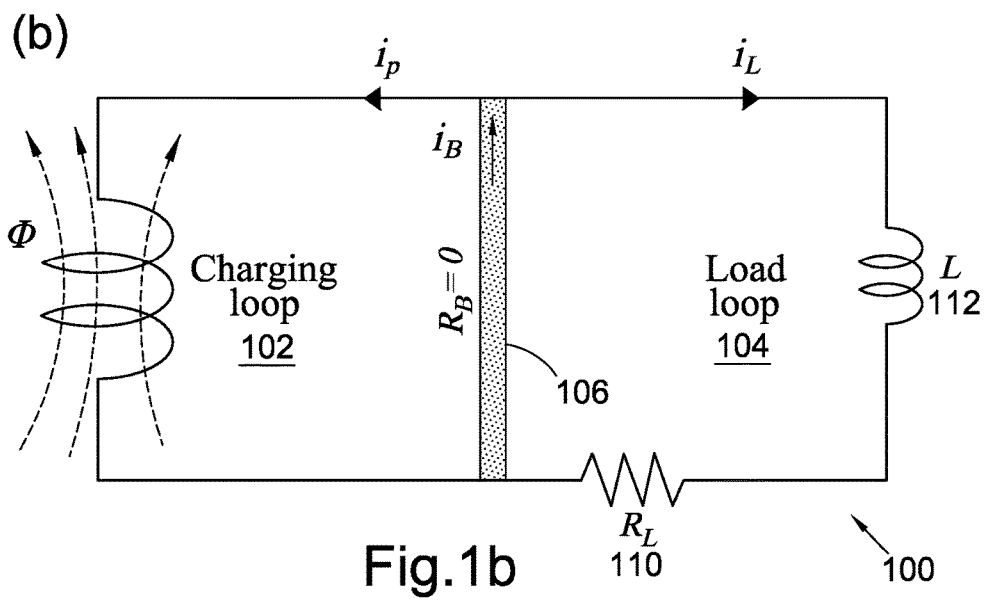

The charging current Ip reverses its direction between FIG. 1*a* and FIG. 1*b* since the applied bridge field is an AC field while the current in the load loop, IL, stays flowing in the same direction throughout. This is possible because the bridge provides an alternate current path.

The bridge which acts as a switch may therefore provide for a flyback loop for the charging circuit. While the bridge is resistive (or in a first state in which the bridge is conductive), current flows from the charging loop to the load loop. While the bridge is superconducting (or in a second state in which the bridge is conductive, whereby the resistance of the bridge is lower in the second state), the current in the charging loop may be reduced without affecting the load loop.

If the current in the charging loop is greater than that in the load loop, current will flow into the load loop. The presence of the superconducting bridge means that when the current is less than that in the load loop, no reversal is observed which wipes out the gains made when the charging current was greater than the load current.

Thus IL may be increased with each successive cycle and flux pumping may be achieved.

As outlined above, in preferred embodiments the device employs a superconducting circuit 100 comprising a loop of superconductor which is shorted by an additional section of superconductor, this gives rise to two loops: a charging loop 102 and a load loop 104 (see the example configuration in FIG. 1). The representation of the circuit given in FIG. 1 is at its simplest level. It will be understood that multiple charge loops and/or multiple load loops may be employed. In addition, the shorting section 106 of superconductor may be any type of superconductor, for example, but not limited to, tape, thin or thick film, wire or others.

A method of inducing a changing flux in the charging loop may be required. This could be from a transformer, an electromagnet or from a moving permanent magnet. No doubt many other methods would occur to the skilled person.

In addition, a method of applying a changing magnetic flux to the shorting section (or bridge 106) of superconductor in order to trigger flux flow may be required. There are many ways known to the skilled person in which this could be done.

The superconducting loop and the bridge loop may all be formed from a single piece of superconductor. Consider a rectangular piece of superconducting tape in which flux is induced in the left hand half (this then corresponding to the charging loop 102 in FIG. 1), an oscillating field may applied to the middle section of the superconductor (this then corresponds to the bridge 106 in FIG. 1), current may then be induced in the right hand half which corresponds to the load loop 104 in FIG. 1. No doubt many other variations will occur to the skilled person.

In some embodiments, there may not be two separate sources (one of current for the charging loop 102 and the other of flux for the bridge 106), but a single source may be used.

In embodiments it is advantageous for there to be two separate sources one to provide the driving current and one to induce flux flow, as the rate of charging will be a function of the relative phases, frequencies and magnitudes of the two sources. It may also be advantageous to vary the dynamic resistance and the input current independently. The dynamic resistance is dependent on both transport current and on the applied magnetic field and as the current in the load loop 104 builds up, it would be advantageous to change the field applied to the bridge 106 in order to dynamically control the dynamic resistance.

As can be seen from equation 1 above, the dynamic resistance is a function of the frequency, f, and the amplitude of the oscillating field, $B_a$, and of the (normal) critical current. The (normal) critical current is also dependent on the background field. Therefore, it may be advantageous for the field $B_a$ to be applied to the bridge 106 with an additional control or modulation. This additional control or modulation may be provided by one or both of controlling the background field (and hence (normal) critical current in equation (1)), and controlling the amplitude of the oscillating field $B_a$. Thus the field $B_a$ provides a high frequency magnetic field and the dynamic resistance may be controlled by changing the amplitude of $B_a$ and/or changing the value of a background field.

The efficiency of the system may be a function of the relative magnitudes of the dynamic resistance, the inductance of the system and the resistance of any joints in the system.

An analytical model and experimental results are provided below which describe the behaviour of the system.

The characteristics of the system are such that the efficiency may be changed during operation by adjusting the dynamic resistance (by changing its modulation frequency or its (normal) critical current—for example by warming/cooling the bridge or by applying a background field 106) and the relative proportions of the periods for which the bridge 106 is on and for which it is off.

Since the dynamic resistance may also be a function of the length of the bridge 106 in the field generator by the magnetic field generator 108, the value may be changed either by having a different length bridge 106 or by applying the bridge field to more or less of the bridge 106, for example the bridge actuation magnet could be made in two sections.

The system as described uses a single switch to achieve flux pumping. Embodiments as described herein may be used in parallel with a second switch to achieve flux pumping.

Analytical Model

Referring to FIG. 1 the operation of the pump may be explained as follows, where the symbols used are:

$i_p$: charging loop current;
$I_p$: average value of $i_p$;
$B_a$: field applied to the bridge;
T: period of $i_p$;
$R_L$: flux flow resistivity of the load loop (we note that the phrase load loop resistance may be used equivalently throughout the description);
$R_{dyn}$: dynamic resistance of the bridge;
$i_L$: load current;
p: proportion of the time T for which $B_a$ is applied.

When $B_a$ is applied, flux flow will be triggered on the bridge 106. The flux injected into the load during this time is $$\Delta\phi_{on}=(I_p-i_L)R_{dyn}pT-i_LR_LpT \quad (2)$$

When $B_a$ is removed, the load is short circuited by the superconducting bridge 106 (FIG. 1(b)). The flux that flows out of the superconducting loop is $$\Delta\phi_{off}=-i_LR_L(1-p)T \quad (3)$$

Therefore, during each $i_p$ cycle, the net flux increase in the superconducting load can be expressed as $$\Delta\phi=\Delta\phi_{on}+\Delta\phi_{off}=I_pR_{dyn}pT-i_LT(R_{dyn}p+R_L) \quad (4)$$

Considering T is very short compared with the whole process of charging the load, the variation of $i_L$ in an $i_p$ cycle is neglected. Thus Eq. (4) can be described in differential equation form as $$\frac{\Delta\phi}{T}=L\frac{di_L}{dt}=I_pR_{dyn}p-i_L(R_{dyn}p+R_L) \quad (5)$$

where L is the load inductance.
The solution for Eq. (5) is $$\begin{cases} i_L = A(1-e^{-t/\tau}) \\ A = I_p/(1+R_L/R_{dyn}p) \\ \tau = L/(R_L+R_{dyn}p) \end{cases} \quad (6)$$

According to Eq. (6), the final load current is proportional to Ip, the current in the charging circuit. Hence the magnetization of the load coil is a function of the magnitude of the induced current in the charging loop 102. It is also a function of the relative phases of the field applied to the bridge 106, the dynamic resistance and the percentage of the period for which Ba is applied.

The method is dependent on the dynamic resistance, not the value of Ba. Thus it may not be necessary to remove Ba entirely, but it may be sufficient to modulate Ba such that the dynamic resistance is also modulated. By varying these parameters accordingly, the device may be used to vary the output current in the coil and hence the magnetic field developed.

Preferably, therefore, the apparatus includes control systems to control the current Ip in the charging loop 102 and the field Ba applied to the superconducting bridge 106.

In embodiments, a three-part superconducting flux pump apparatus is provided comprising a first part including a superconductor, and a second part comprising a charging and/or discharging unit for changing the magnetisation of the superconductor, the charging/discharging unit including at least a source of changing magnetic field. The third part provides a driving current with which to charge the superconductor as described above.

Preferably, the superconductor comprises a high temperature ($T_c$) superconductor such as a so-called cuprate superconductor, preferably YBCO (yttrium barium copper oxide). However, methods and devices described herein apply to all superconductors, both low and high temperature superconductors.

Experimental Validation

Figure 2:
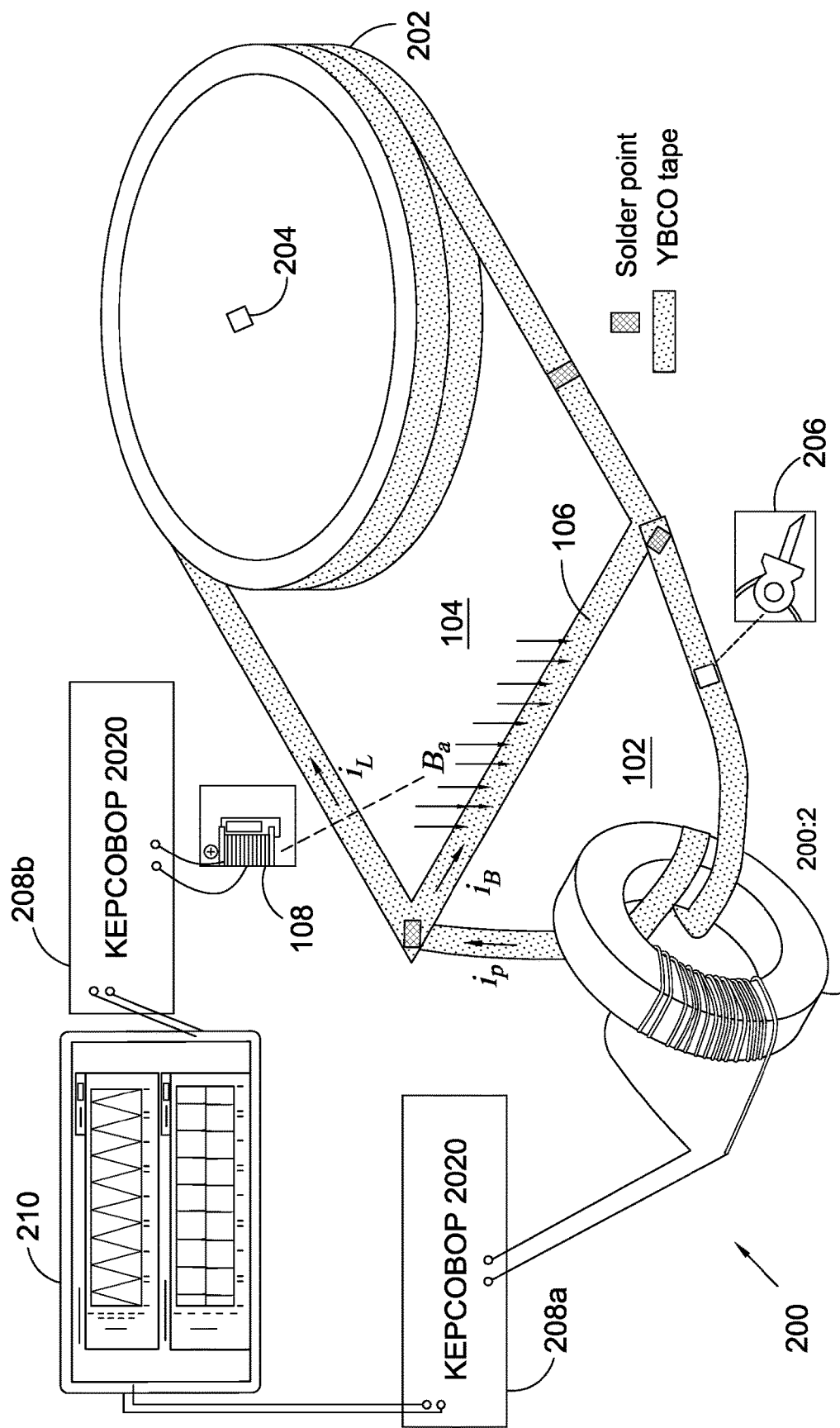
FIG. 2 shows a schematic of an experimental system according to embodiments of the present invention.

FIG. 2 shows a schematic of an experimental system according to embodiments of the superconducting circuit described herein.

In this example, as depicted in FIG. 2, the load loop 104 was a double pancake coil wound from Superpower 6 mm width YBCO tape 202, with the two ends soldered together. The coil inductance and (normal) critical current was measured to be 0.388 mH and 81 A at 77K respectively. The joint resistance was measured to be $1.2\times10^{-7}\Omega$. The charging loop 102 was formed by another same type 1 m long YBCO tape, with its two ends soldered to part of the load loop superconductor. A 200:2 ratio transformer 212 was used to induce $i_p$ in the charging loop 102. $B_a$ was generated by a 36 mH electromagnet 108, which has a 35×12 mm cross section iron core with a 1 mm air gap. The tape 106 shared by the two current loops was put into the center of the 1 mm air gap, so that $B_a$ was applied perpendicular to the wide surface of tape 106. The effective area subjected to the field was 35×6 mm². The YBCO tape was measured to have a (normal) critical current of 123 A in the air gap at 77K (with $10^{-4}$V/m criterion). The transformer 212 was powered by a Kepco power supply 208a. The electromagnet 108 was powered by another Kepco power supply 208b. Both power supplies worked in current mode. The signals controlling the two Kepco power supplies 208a, 208b were generated by Labview software and outputted by NI-USB6002 DAQ card 210. Charging loop current $i_p$ was measured by a Hall effect open loop current sensor 206. Load current $i_L$ was measured by a Hall sensor 204 fixed at the center of the coil. Applied field $B_a$ was monitored by measuring the current supplying the field magnet. The superconducting system worked in liquid nitrogen (77K).

Figure 3:
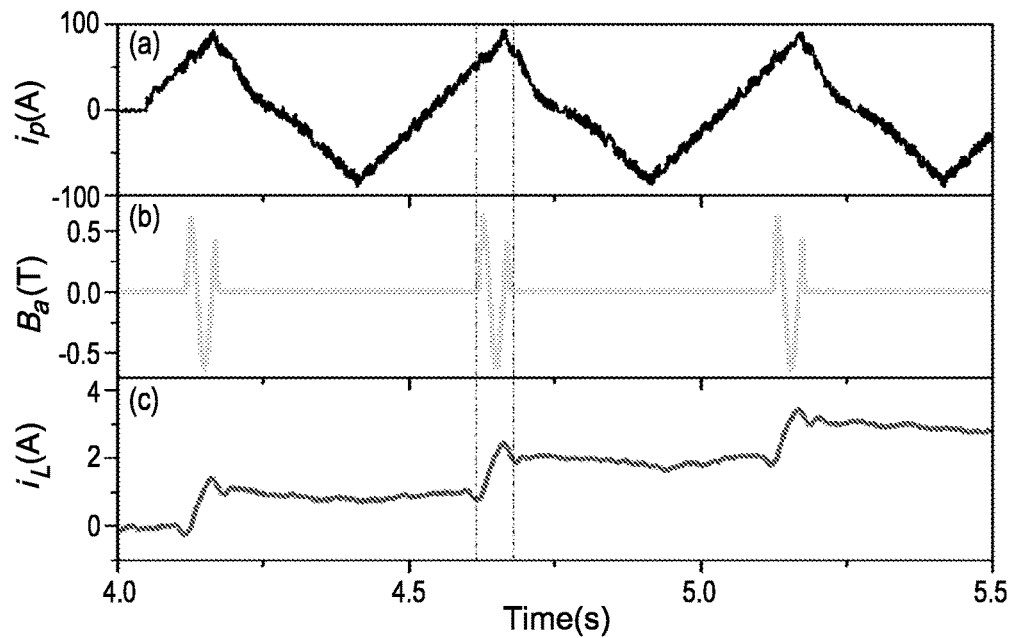
FIG. 3 shows charging loop current, applied field and load loop current versus time.

FIG. 3 shows waveforms of charging loop current $i_p$, applied field $B_a$ and load loop current $i_L$, in this example, during the first three cycles of charging.

$i_p$ had, in this example, a magnitude of about 90 A and a frequency of 2 Hz. $B_a$ had a frequency of 20 Hz with a magnitude of 0.65 T. In each $i_p$ cycle, $B_a$ was applied for 0.05 s. From FIG. 3, it is clear that each time $B_a$ was applied to the bridge superconductor, the current in the load loop 104 increased. The results in FIG. 3 fundamentally proved that flux pumping can be achieved by AC field triggered flux flow in current carrying HTS tape. Although the transport current $i_B$ in the bridge superconductor had a 2 Hz AC component, it did not change polarity in $B_a$ duration, so that the flux flow was unidirectional.

Figure 4:
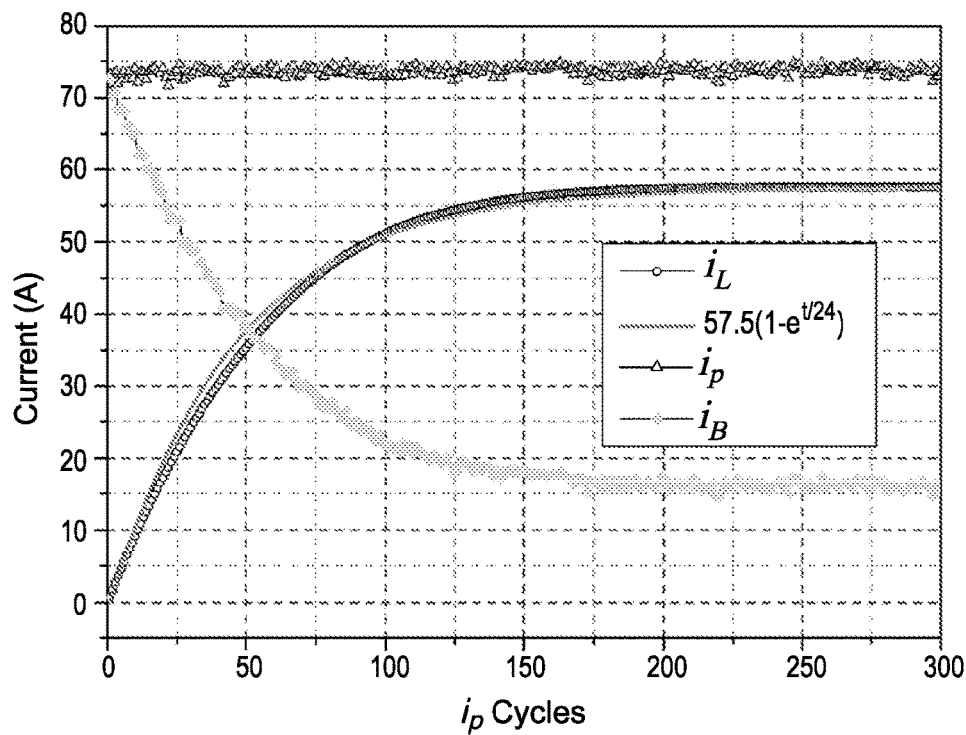
FIG. 4 shows charging loop current, load loop current and bridge current versus charging loop current cycles.

FIG. 4 shows waveforms of currents during the whole charging process. The average transport current experiencing external field during each $i_p$ cycle is $I_B=I_p-i_L$.

During the charging process, $I_p$ remained, in this example, a value of 74 A. The load current $i_L$ can in this example be well fitted by $i_L=57.5(1-e^{-t/24})$ which has the same form as predicted in Eq. (6). According to Eq. (6), $R_{dyn}$ is calculated to be 0.131 mΩ, and $R_L$ is 3.73 μΩ. We also measured the value of $R_{dyn}$ under DC transport current with 20 Hz, 0.65 T applied field, and the value was 0.106 mΩ. The value of $R_{dyn}$ in the flux pump is slightly larger than in DC transport current condition. This is because the transience in $B_a$ made its real frequency between 20 Hz and 30 Hz, as shown in the middle part of FIG. 3. Using Bean's model, the value of $R_{dyn}$ is calculated to be 0.044 mΩ, which is less than half of 0.106 mΩ due to the field-critical current dependency of the bridge superconductor.

The value of $R_L$, however, is much larger than the joint resistance of $1.2\times10^{-7}\Omega$. To understand this phenomenon, $\Delta\phi_{on}$ and $\Delta\phi_{off}$ are extracted from load current waveform according to Eq. 2 and Eq. 3.

Figure 5:
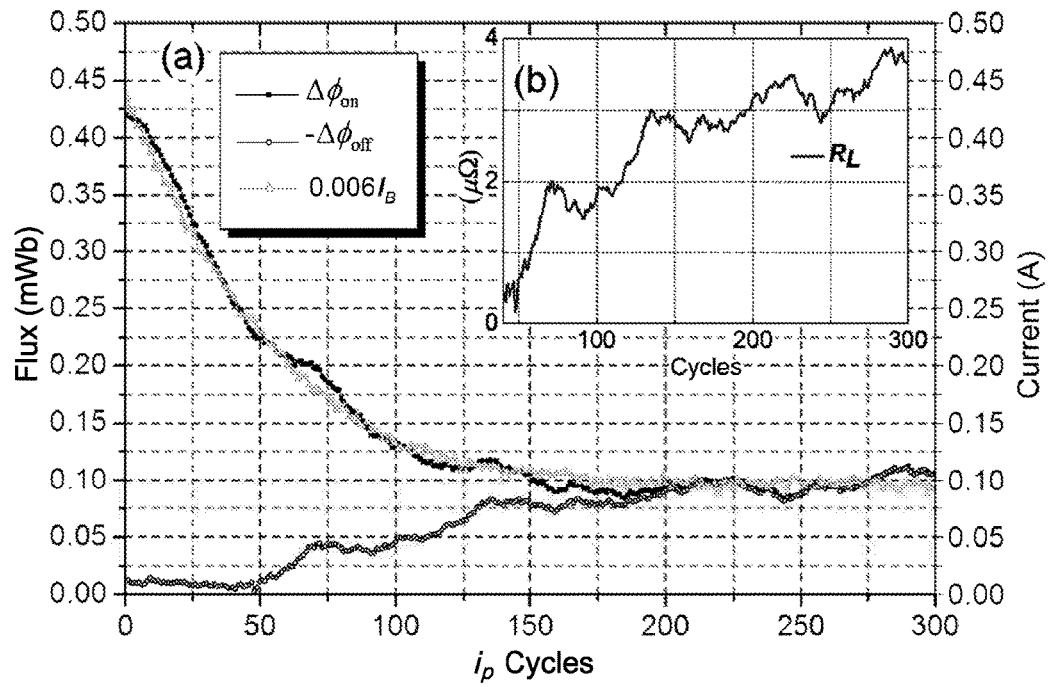
FIG. 5 shows flux injected into the load loop versus charging loop current cycles.

FIG. 5a flux injected into the load and consumed in the load in each $i_p$ cycle in comparison with average bridge current.

As shown in FIG. 5(a), in each $i_p$ cycle, $\Delta\phi_{on}$ is nearly proportional to $I_B$, which indicates that $R_{dyn}$ is constant during the charging process. As $R_{dyn}$ is much larger than $R_L$, its value can be approximately calculated by $\Delta\phi_{on}/I_B pT=0.129$ m$\Omega$, which is close to the value of 0.131 m$\Omega$ calculated by Eq. (6). $-\Delta\phi_{off}$ remained a very small value in the beginning, but increased rapidly after 50 $i_p$ cycles. $R_L$ in each $i_p$ cycle is calculated by Eq. (3) using $-\Delta\phi_{off}$ and $I_L$. FIG. 5b shows the instantaneous value of load loop resistance versus the number of cycles. As shown in FIG. 5(b), after the $50^{th}$ $i_p$ cycle, $R_L$ increased sharply from 0.4 $\mu\Omega$ to a stable value of about 4 $\mu\Omega$, because after 50 $i_p$ cycles, $i_L$ exceeded 35 A.

As outlined above, a superconductor such as a type II or HTS superconductor will present resistance when it is carrying current and at the same time subjected to magnetic field.

Embodiments described herein may be employed as a transformer superconducting flux pump which comprises three parts, a current transformer, a superconducting coil and a bridge.

Figure 6:
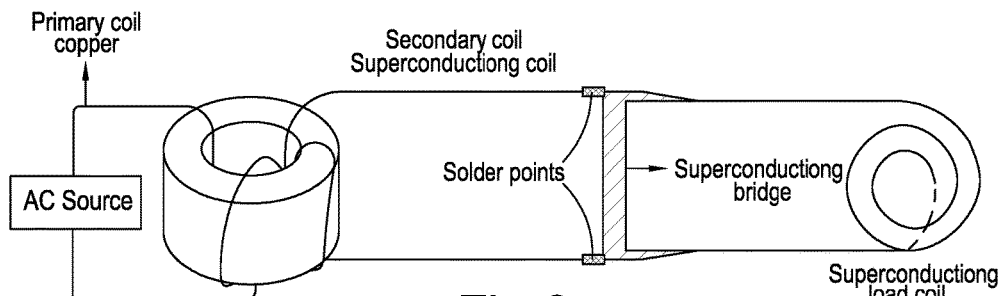
FIG. 6 shows a schematic of a system according to embodiments of the present invention.

FIG. 6 shows a schematic of a transformer superconducting flux pump according to embodiments described herein.

In this example, the primary side of the current transformer is made by a copper wire with about 200 turns. The primary side is excited by AC current source. The secondary side of the transformer is a piece of superconducting tape, which has several turns (1 turn may be sufficient). The ends of the secondary side are soldered to part of the tape in the load coil, as shown in FIG. 6. The superconducting load is a closed loop coil, which is made of a superconducting tape with its ends soldered together. The piece of tape between the two soldering points acts as the superconducting bridge. This bridge is subjected to a controllable magnetic field.

The following table shows parameters of the experimental system used in this example:

TABLE I

| Parameters of the experimental system | |
| --- | --- |
| Tape Ic | 180 A |
| Coil Ic | 80 A |
| Tape length of coil | 10.6 m |
| Coil inductance | 0.388 mH |
| Bridge length | ~4 cm |

It is important to control the time sequence of energizing the secondary coil and operating the bridge. When there is no field applied to the bridge, the bridge is superconducting. When an AC field is applied perpendicularly to the surface of the bridge tape, the bridge presents a resistance. So if the current of the secondary coil is flowing to the bridge, and at the same time, the bridge presents resistance, there will be a voltage across it, which will energize the superconducting load. If we control the bridge in a way that when the AC current of the secondary side is positive (or, more strictly, larger than a certain positive value) the bridge is on (presents resistance) otherwise it is off (superconducting), then a quasi-DC voltage component across the bridge is obtained, which will eventually pump flux (current) into the closed load coil.

Figure 7:
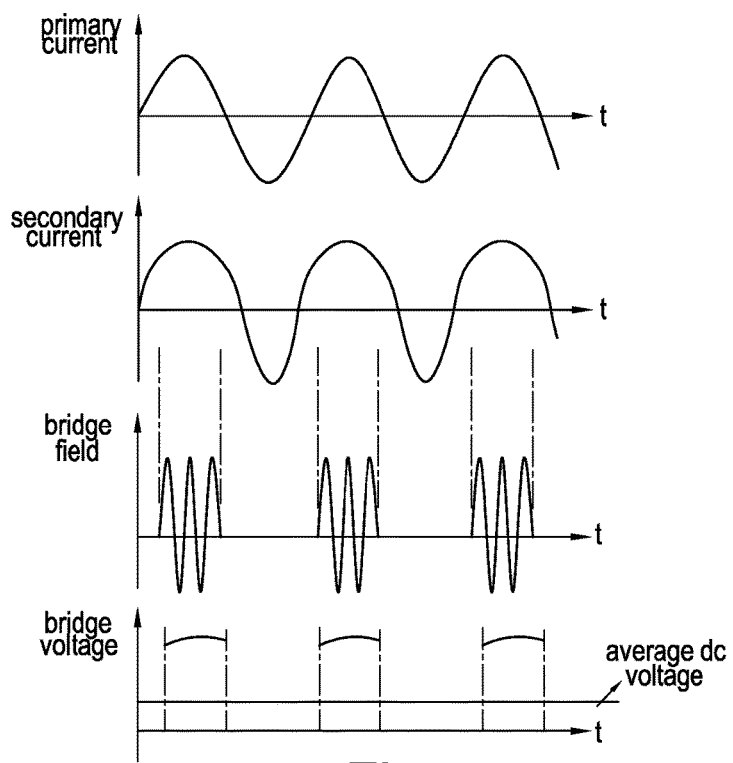
FIG. 7 shows a control sequence of currents and magnetic field.

FIG. 7 shows the time sequence of fields and currents used in this example to operate the system shown in FIG. 6.

In this example, the primary and second currents are synchronous. The bridge field is applied, in this example, with a higher frequency compared to the frequency of the primary current during intervals when the primary current has a positive sign and is above zero. The bridge voltage as shown in the bottom part of FIG. 7 is constant above zero during periods when the bridge field is applied. The average bridge voltage is indicated in the bottom part of FIG. 7.

Figure 8:
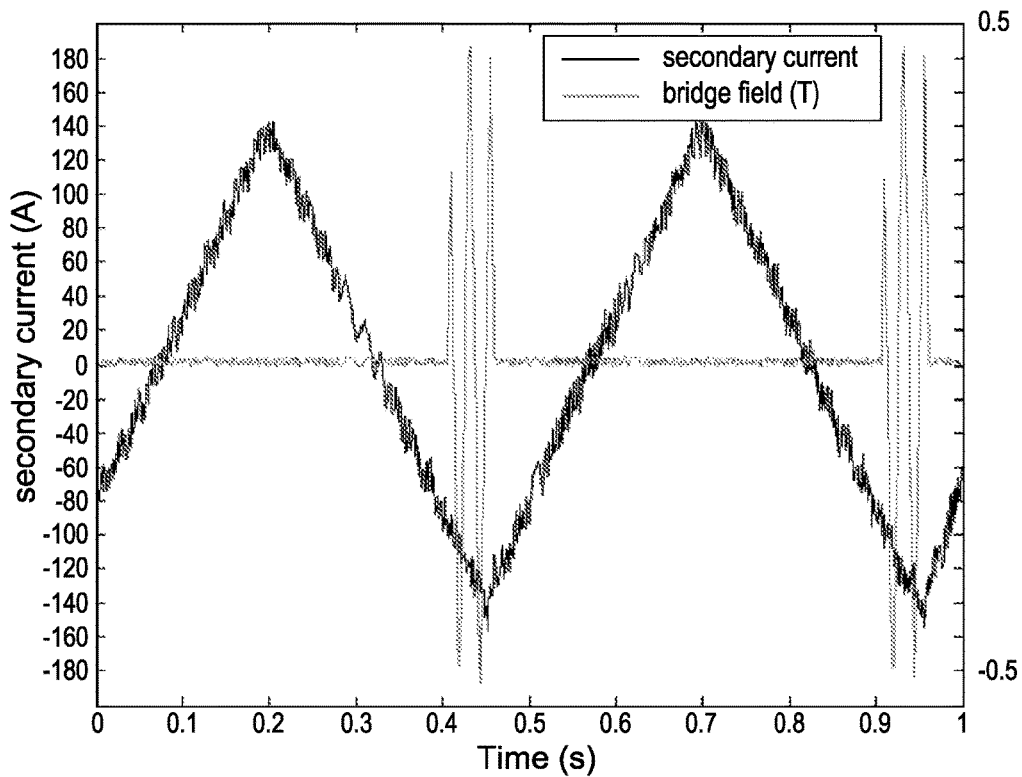
FIG. 8 shows secondary current and magnetic field, respectively, versus time.

FIG. 8 shows the waveforms of the secondary current and the applied bridge field as controlled and measured using the example sequence shown in FIG. 7.

Controllable variables in the experiment includes for example: magnitude of secondary current, frequency of secondary current, magnitude of bridge field, frequency of bridge field, the duration of bridge field and the relative phase between secondary current and bridge field. By varying these parameters, an optimized pumping performance may be achieved.

Figure 9:
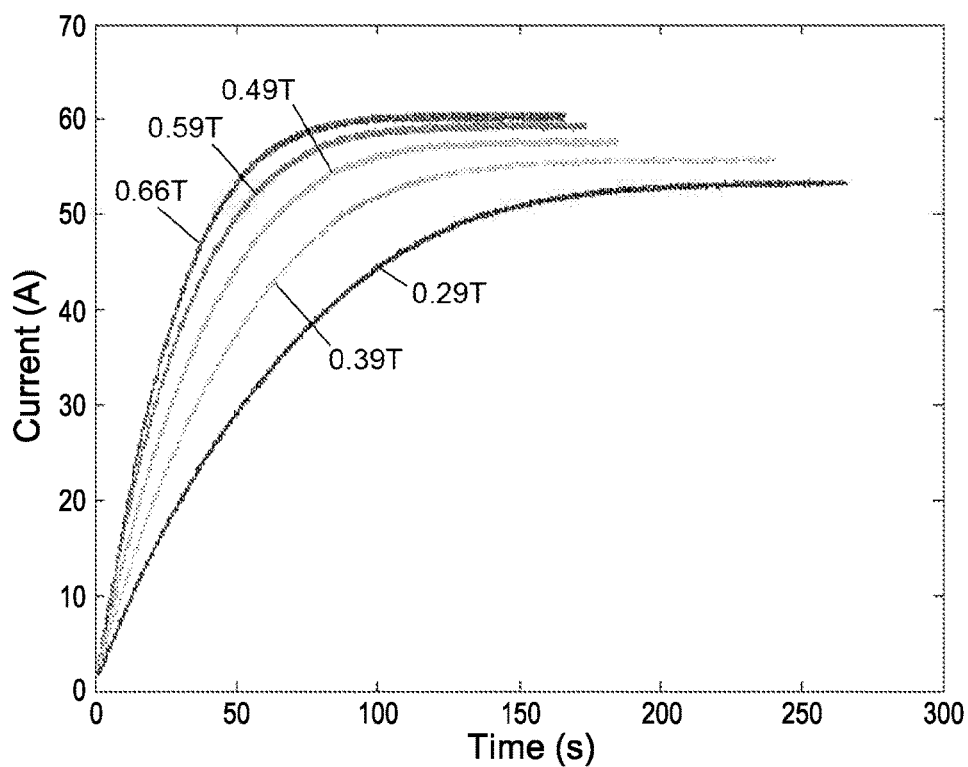
FIG. 9 shows load loop current versus time for different magnetic fields.

FIG. 9 shows the influence of the bridge field intensity on the load loop current which is plotted against time for different magnetic fields applied to the bridge.

In this example, the bridge field frequency is set to be 20 Hz, the secondary current frequency is 2 Hz, the secondary current magnitude is around 140 A, the bridge field duration is 10% of the period of the secondary current waveform and in phase with the secondary current. Bridge field intensity varies from 0.29 T to 0.66 T.

It can be seen that the load loop current obtained increases over time and is higher for higher magnetic fields applied to the bridge for an initial period of 200 to 250 s during which the measurements were taken. For a magnetic field applied to the bridge of 0.66 T, a load loop current of approximately 60 A is obtained.

Depending on the magnetic field applied to the bridge, the load loop current flattens out, in these examples, after a period of approximately 100 to 200 s.

Figure 10:
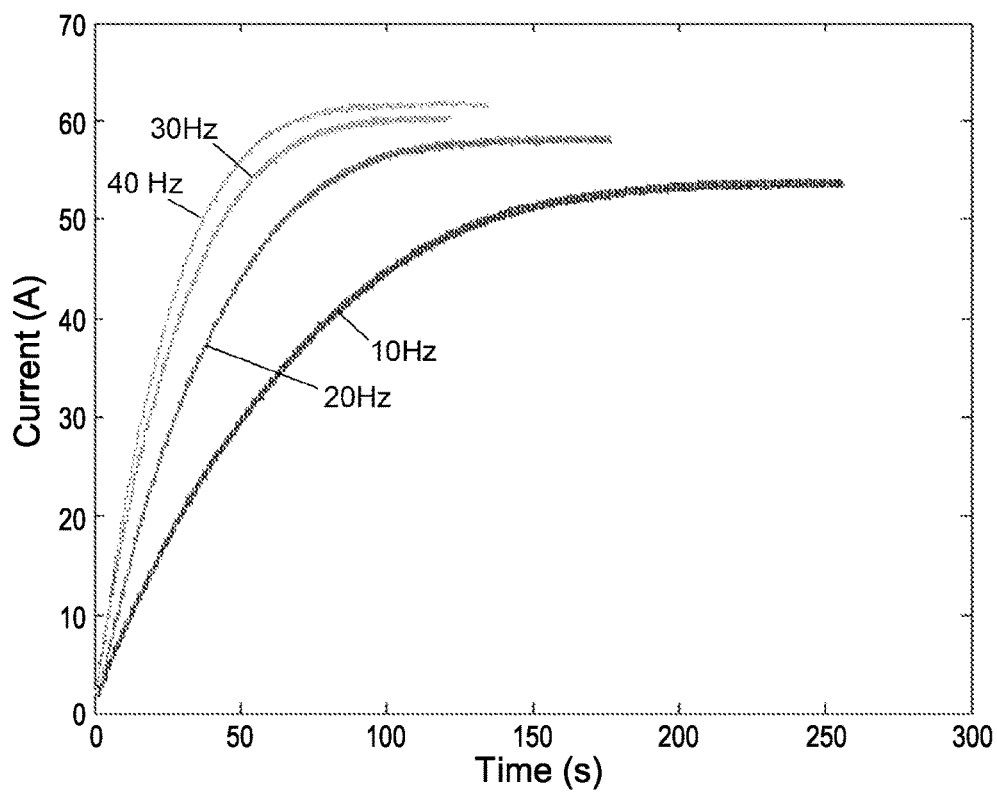
FIG. 10 shows load loop current versus time for different frequencies of the applied magnetic field.

FIG. 10 shows the influence of the bridge field frequency on the load loop current which is plotted against time for different bridge field frequencies.

In this example, the secondary current frequency is 2 Hz, the secondary current magnitude is around 140 A, the bridge field duration is 10% of the period of the secondary current waveform. The bridge field intensity is 0.66 T. The bridge field frequency varies, in this example, from 10 Hz to 40 Hz.

As can be seen, the load loop current increases over time and increases for increasing bridge field frequency for an initial period of 150 to 250 s during which the measurements were taken. For a bridge field frequency of 40 Hz, the load loop current increased, in this example, to approximately 60 A during an initial time interval of approximately 100 s.

Figure 11:
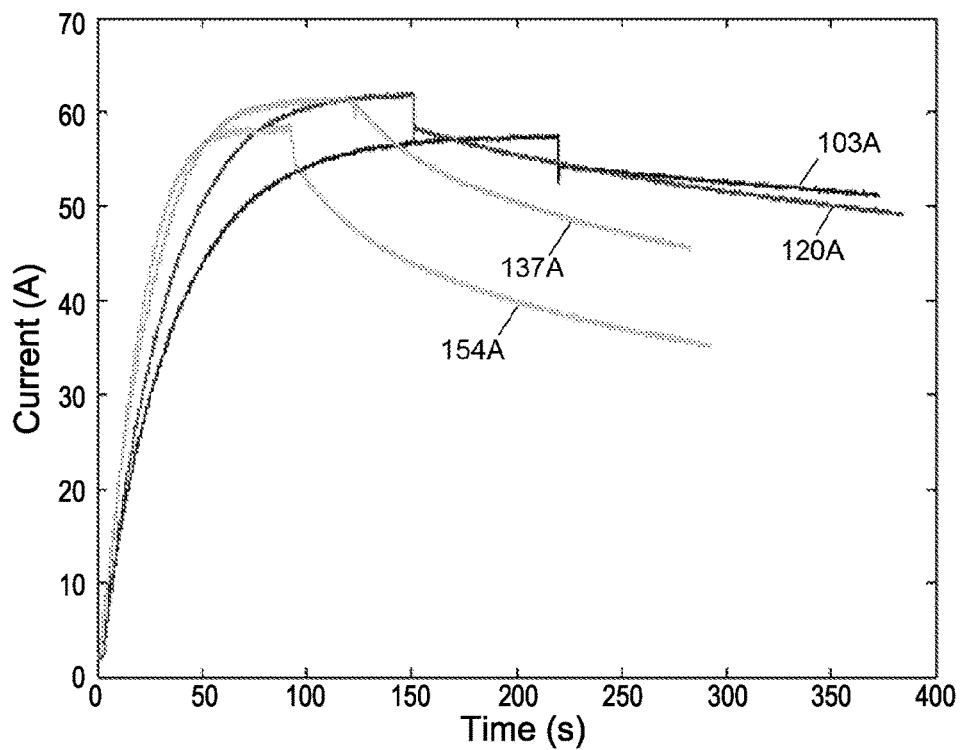
FIG. 11 shows load loop current versus time for different secondary currents.

FIG. 11 shows the influence of the secondary current magnitude on the load loop current which is plotted against time for different secondary currents.

In this example, the bridge field frequency is set to be 40 Hz and the secondary current frequency is 2 Hz. The bridge field duration is 10% of the period of the secondary current waveform and in phase with the secondary current. The bridge field intensity is 0.49 T. The magnitude of the secondary current varies, in this example, from 103 A to 154 A.

As can be seen, the pump speed is proportional to the magnitude of the secondary current, but the load loop current is not proportional to the magnitude of the secondary current. This is because the secondary current causes loss on the bridge which results in a decay of the load current.

Figure 12:
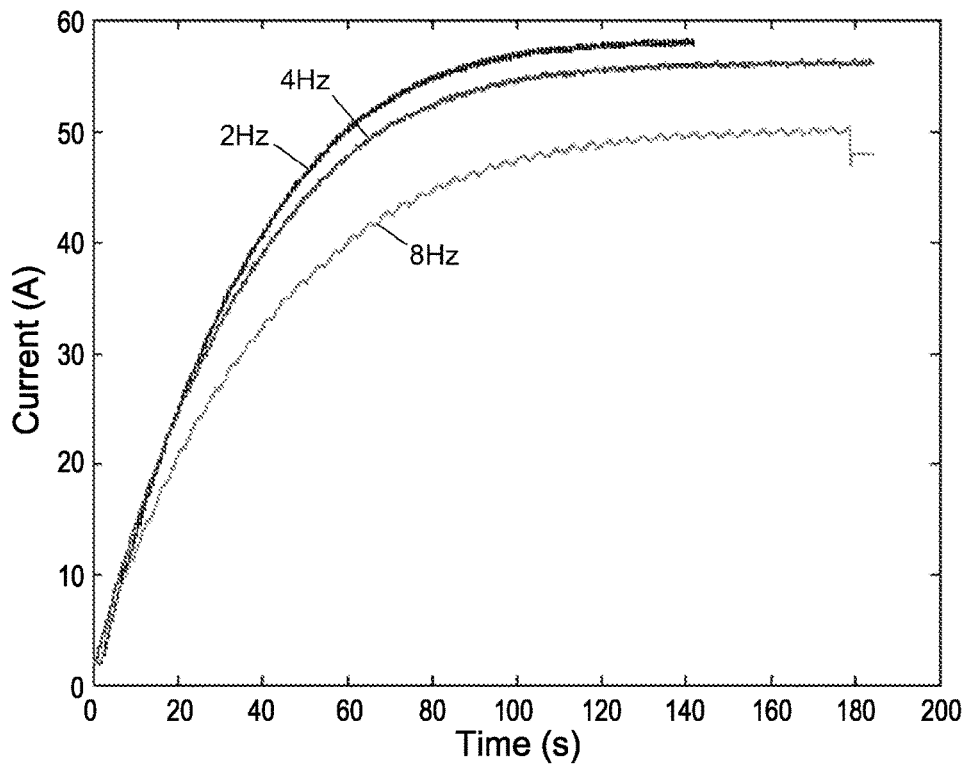
FIG. 12 shows load loop current versus time for different secondary current frequencies.

FIG. 12 shows the influence of the secondary current frequency on the load loop current which is plotted against time for different secondary current frequencies.

In this example, the bridge field frequency is set to be 80 Hz and the field intensity is 0.25 T. The bridge field duration is 10% of the period of the secondary current waveform and in phase with the secondary current. The magnitude of the secondary current is 137 A. The secondary current frequency is varied in this example from 2 Hz to 8 Hz.

As can be seen, the load loop current increases over time and increases for decreasing secondary current frequency for an initial period of approximately 150 s during which the measurements were taken.

An AC loss occurs which is caused by the secondary current on the bridge. Since a bridge field frequency of 80 Hz is used, in this example, for a secondary current frequency of 8 Hz, it is more difficult than for a lower secondary current frequency, e.g. 2 Hz, to keep the secondary current and field in phase in order to obtain an oscillation.

It was found that, in these examples, a bridge field duration of 10% of the period of the secondary current waveform resulted in a better pumping performance than for a ridge field duration of 20% of the period of the secondary current waveform. The pumping performance may further depend on the waveform itself of the secondary current. An improved flux pumping performance was obtained, in these examples, when the applied bridge field and the secondary current are in phase (as shown in FIG. 8).

Calculations

Figure 13:
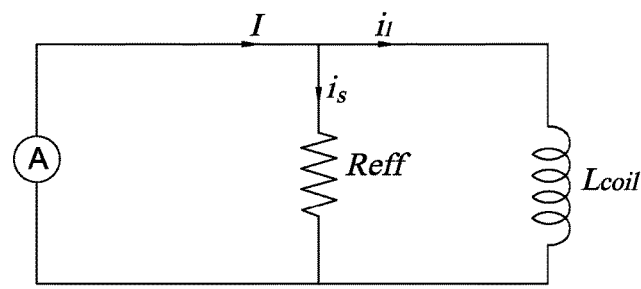
FIG. 13 shows a schematic representation of a flux pump according to embodiments of the present invention.

The following calculations refer to FIG. 13 which show a simplified schematic representation of an equivalent circuit of a flux pump according to embodiments described herein.

Assuming there is no loss when the bridge is in the on state, and the current transformer is powerful enough (the secondary current is proportional to the primary current when the bridge is on and when the bridge is off) and the equivalent bridge resistance $R_{eff}$ is subjected to an average secondary current of I, then:

$$L_{coil}\frac{di_l}{dt} + i_l R_{eff} = I R_{eff} \quad (7)$$

From Eq. (7), the time constant is proportional to $L_{coil}$, and anti-proportional to $R_{eff}$, the final load current is close to I (if I does not exceed the (normal) critical current).

$$R_{eff} = \frac{2Sf}{I_{c0}}\left(B_a + \frac{B_a^2}{B_0}\right) \times p \quad (8)$$

where S is the area of bridge, f is the bridge field frequency, $B_a$ is the bridge field intensity, and P is the time duration when the bridge is on. With typical values of $S=2.4*10^{-4}$, $f=30$, $I_{c0}=180$, $(B_a+B_a^2/B_0)=3$, $p=0.1$, R is calculated to be $1.6*10^{-5}$ ohm.

Assume that I=100 A, then initially the pumping speed is $2.4*10^{-3}/L_{coil}$ A/s. For a 1 mH coil, the pumping speed is about 2.4 A/s.

The performance may be improved by increasing the bridge area, the field intensity, the field frequency, and/or the duration of the applied field.

The bridge resistance was shown to be important for the pumping speed and the final load current. The larger the resistance value, the higher the pumping speed which may be achieved. The following factors may affect the resistance value: the applied field intensity, the frequency and the duration of the applied field.

The secondary current magnitude may also play an important role in flux pumping. A larger secondary current may not necessarily be better, because a secondary current which is too large may generate considerable loss in the bridge, which may result in a decay of the load current.

The secondary current frequency has a smaller influence on the pumping performance, as long as the current transformer is not saturated due to a relatively low frequency (less than approximately 1 Hz).

If the current noise in the secondary current and the applied field are too large, they may generate large a AC loss on the bridge, which should be minimized.

Superconductors

Preferred superconductors are high temperature superconductors such as cuprates, e.g. YBCO, which may be prepared as a thin film, a thick film, a tape, a wire or as bulk materials. Cuprates have a relatively high $T_c$ (critical temperature) and can trap high fields, but in principle any type II superconductor may be employed. As used here a high temperature superconductor may be a superconductor with a superconducting transition temperature $T_c$ of greater than 30K (the theoretical maximum permitted by BCS theory), preferably equal to or higher than 77K.

There are variations of YBCO in which the Yttrium is replaced with other rare earths, such as, for example, Gadolinium or Rubidium (these are generally referred to as ReBCO). Other candidates may be BSCCO either in the 2212 or the 2223 forms, or magnesium diboride (MgB2) which has the virtue of being very cheap but has a low $T_c$ (in the middle 30's Kelvin). There are a whole host of other materials which may be used, for example, but not limited to the lanthanides or the compounds based on mercury or thallium.

There are also a large number of materials that can be described as organic superconductors. These include, for example, the Bechgaard salts and the Fabre salts which are both quasi one-dimensional, and quasi two-dimensional materials such as, for example, Kappa-BEDT-TTF$_2$X, lambda-BETS$_2$X and graphite intercalation compounds as well as three-dimensional materials such as, for example, the alkali-doped fullerenes.

A list of candidate cuprates may be found in "Superconducting materials—a topical overview", Hott, Roland; Kleiner, Reinhold; Wolf, Thomas et al. (2004-08-10) oai: arXiv.org:cond-mat/0408212. They include high temperature superconductor families, for example: Bi-HTS (Bi-m$^2$(n–1)n, BSCCO); Tl-HTS (Tl-m$^2$(n–1)n, TBCCO); Hg-HTS (Hg-m$^2$(n–1)n, HBCCO); Au-HTS (Au-m$^2$(n–1)n); 123-HTS (RE-123,RBCO); Cu-HTS (Cu-m$^2$(n–1)n); Ru-HTS (Ru-1212); B-HTS (B-m$^2$(n–1)n); 214-HTS (LSCO"0202"); (Electron-Doped HTS PCCO NCCO); ("02 (n–1)n"); Infinite-Layer HTS (Electron-Doped I.L.).

Further Examples

We now describe some further examples of embodiments of the system which preferably (though not essentially) employ HTS for example HTS coated conductors (HTS CC), driven into the flux flow region of the E-J curve.

Figure 14:
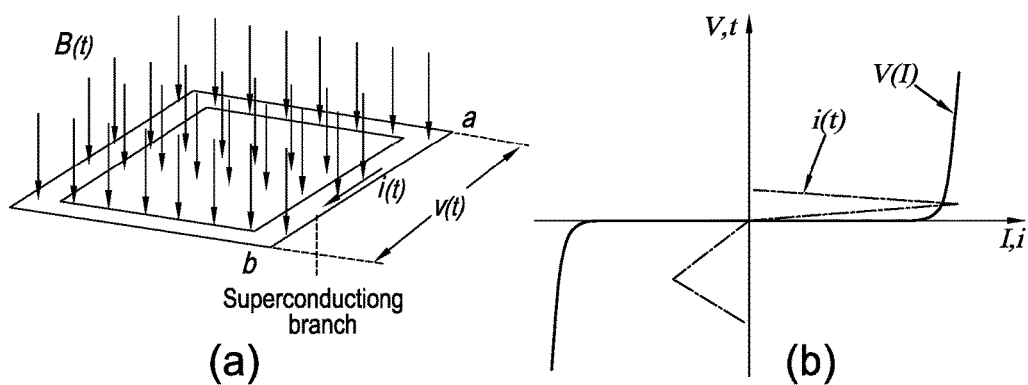
FIGS. 14a and 14b show, respectively, a varying magnetic field applied to a loop which includes a superconducting branch, and a VI curve and waveform for the loop.

Referring to FIG. 14a, a varying magnetic field is applied to a loop which includes a superconducting branch ab. An alternating current i(t) circulating the loop is induced by the field. The field can be changed so that, taking into account the resistance and inductance of the loop and the changing rate of the applied field, i(t) is asymmetrical whilst the DC component of i(t) is zero. (In the transformer-driven case described later, this is simply a matter of driving the primary with an asymmetric current waveform). The V-I curve of branch ab and the waveform of circulating current i(t) are plotted together in FIG. 14b. The negative peak value of i(t) is less than the flux flow critical current of branch ab, so no voltage is induced across branch ab. However in the positive half cycle, its peak value exceeds the flux flow critical current of the branch. In a short period around the positive peak, the superconductor is thus driven into the flux flow region. Therefore, during each cycle, there is a net flux flowing across branch ab, and the dc voltage across branch ab is non-zero. If a superconducting load inductor is connected to branch ab, it will gradually be charged.

Referring back to FIG. 2, as previously described the superconducting connection (bridge) may be driven into the flux flow regime in addition to or instead of applying an ac magnetic field. Thus the superconducting connection (bridge) may be controlled between substantially zero resistance and resistive states whilst remaining superconducting (i.e. whilst not at any time going normal). Thus in an example embodiment, rather than a symmetric drive waveform being used (as shown in FIG. 2), an asymmetric drive waveform may be used to generate an asymmetric current in the secondary winding of the transformer.

Figure 15:
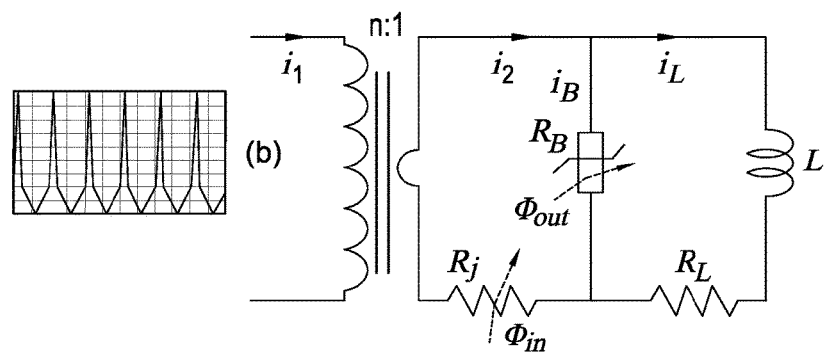
FIG. 15 shows an equivalent circuit of a flux pump system.

This is depicted schematically in FIG. 15, which shows an equivalent circuit of the flux pump system, in which $R_J$ denotes the joint resistance, $R_B$ denotes flux flow resistance of the bridge superconductor, $R_L$ is an equivalent resistance in the load loop (which includes joint resistance and other losses), and L is the load inductance. The bridge inductance is too small to be considered. Thus, here, the origin of $R_B$ is flux flow within high-$T_c$ superconductor. The flux flow direction has also been shown in the circuit. The joint resistance $R_J$ is important to damp down any direct current component in the secondary winding (otherwise the transformer iron core can be saturated). In one experiment the total joint resistance was estimated to be $R_J$=10 µΩ. In preferred embodiments the bridge has a lower current capacity than the secondary/load winding.

When the secondary current $i_2$ (also referred to as $i_P$ earlier) exceeds the flux flow critical current of the bridge, flux flows to the load (L) via the bridge.

Figure 16:
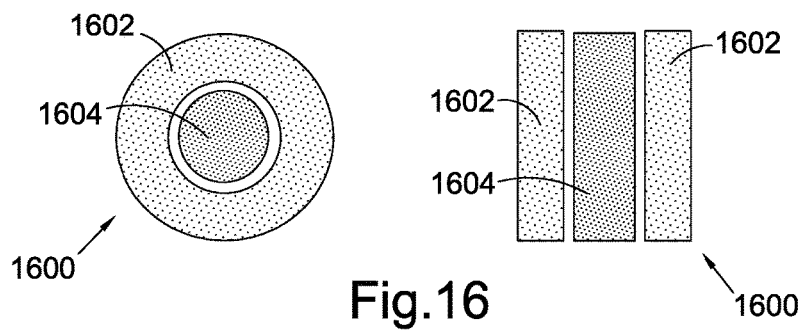
FIG. 16 shows transverse (left) and longitudinal (right) cross sections through an example bridge structure.

Referring to FIG. 16 this shows transverse (left) and longitudinal (right) cross sections through an example of one preferred bridge structure 1600. The example structure comprises a coil of HTS coated conductor, for example superconducting tape, wound onto a ferrite core 1604. Optionally a concentric ferrite cylinder may then enclose the core and tape so that there is a field extending radially between the ferrite core and ferrite cylinder, perpendicular to the surface to the HTS conductor.

In an example experimental system a 100:1 transformer was used to induce an alternating current with a high magnitude in the secondary winding. The secondary winding was made of parallel YBCO tapes with a total critical current of 360 A. Two ends of the secondary winding were soldered together via another piece of YBCO tape to form the bridge. The bridge length was 10 cm and it had a critical current of 180 A. The bridge was also used to short an YBCO double pancake load coil. The inductance of the coil was 0.388 mH and the critical current of the coil was 81 A. (These critical current values were measured at a temperature of 77k with the criterion of $E_0$=10$^{-4}$V/m). The whole superconducting system was immersed in Liquid Nitrogen (LN$_2$).

The primary winding of the transformer was powered by a KEPCO-BOP 2020 power amplifier. The KEPCO was controlled by an NI-USB 6002 data acquisition card which has an output analogue signal programmable from Lab-VIEW. The KEPCO worked in current mode, in which the output current is proportional to the input signal. In this way any desirable primary current can be generated. The primary current i was measured via a 0.5 ohm resistor, the secondary current $i_2$ was monitored by an open loop Hall Effect current sensor, load current $i_L$ was measured by a pre-calibrated hall sensor fixed at the center of the load coil. All the analogue signals were sampled by the NI-USB 6002 card, with a sampling rate of 400 Hz. The load current data were filtered by averaging every 5 continuous samples.

Primary Current Setting and Charging Details

In one experiment we used an alternating triangular signal as the primary current $i_1$. During the period when $i_1$ is positive, $i_1$ ramps up to a peak value $I_{1pp}$ at a constant rate, and then ramps down with the same rate to zero; during the period when $i_1$ is negative, $i_1$ ramps down to a negative peak value of $-I_{1np}$, and then ramps up with the same rate to zero again. The length of positive period over the length of negative period is inversely proportional to $I_{1pp}/I_{1np}$, thus making the dc component in $i_1$ equals to zero, i.e.

$$\int_0^T i_1(t)dt=0$$

Figure 17:
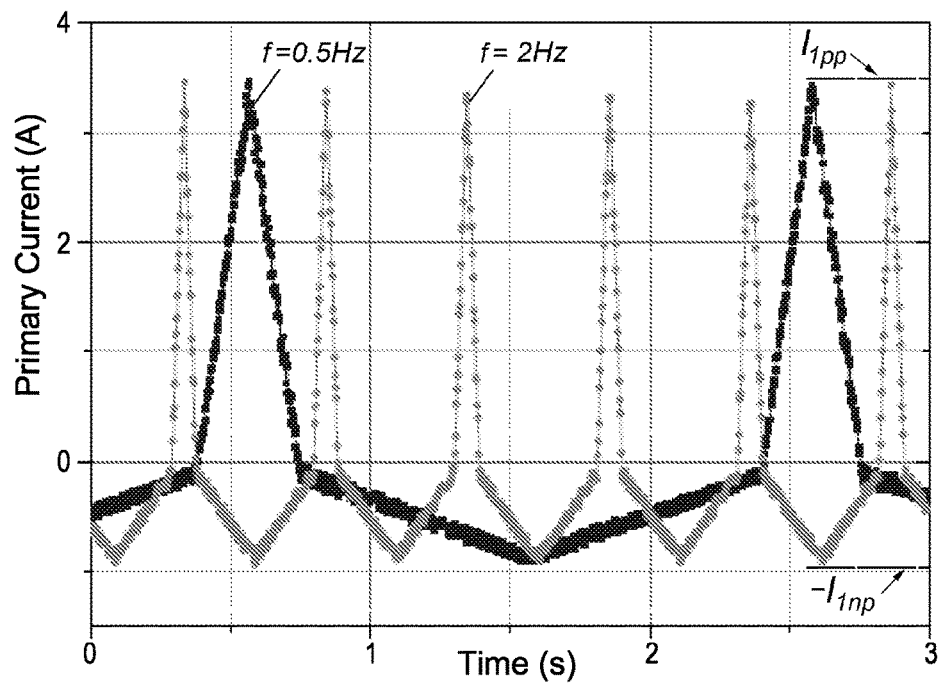
FIG. 17 shows two primary current waveforms with the same peak values but different frequencies.

The controllable parameters include the current positive peak value $I_{1pp}$, the negative peak $-I_{1np}$, and the current frequency f. FIG. 17 shows two primary current waveforms with the same peak values but different frequencies (f=0.5 Hz and f=2 Hz).

Figure 18:
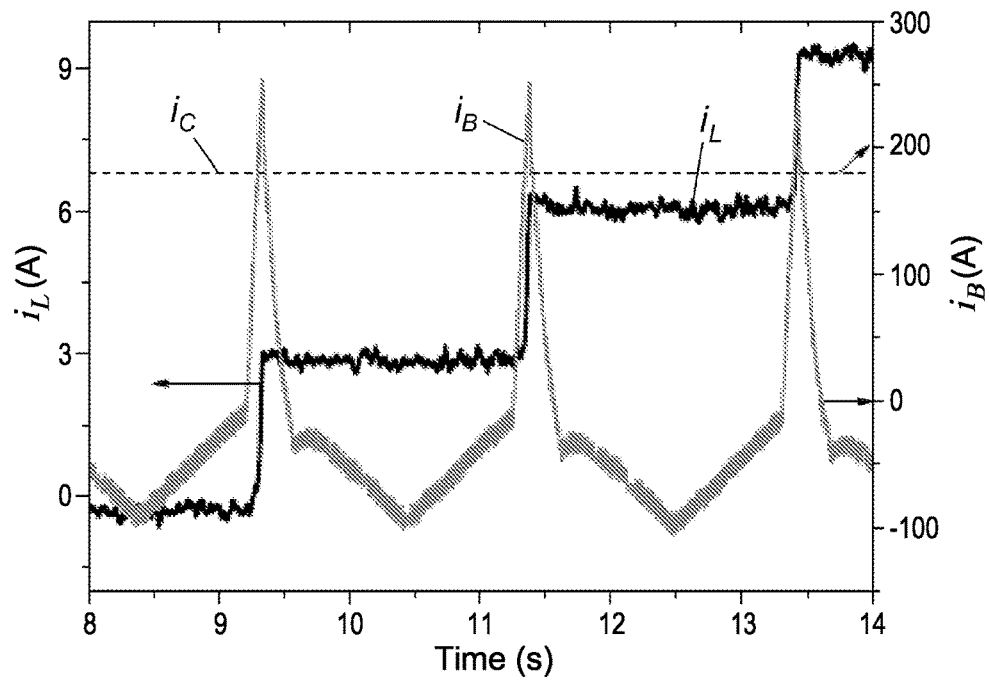
FIG. 18 shows detailed waveforms of bridge current and load current in a flux pump system.

FIG. 18 shows detailed waveforms of the bridge current $i_B$ and the load current $I_L$; the flux flow critical current $i_C$ is denoted by the dashed line. The positive peak current of $i_B$ is about 250 A, and the negative peak value of $i_B$ is around 100 A. The flux flow critical current of the bridge superconductor $i_C$ is 180 A, which is in between the positive peak value and the negative peak value. As can be seen from FIG. 18, at each period when the bridge current exceeds $i_C$, the load current increases by about 3 A; during the rest of $i_B$ cycle, the load current nearly remains stable. The average voltage across the bridge can be expressed as:

$$V = \frac{1}{T_{ff}} \Delta i_L \times L$$

where $T_{ff}$ represents the duration when the bridge superconductor is in flux flow region in each current cycle (about 0.1 s in FIG. 18), and $\Delta i_L$ denotes the current increase in each cycle, estimated to be 3 A. L is the inductance of the load, which was 0.388 mH in this experiment.

From the above values voltage V is estimated to be 11.64 mV; the electric field is then calculated to be 1.16 mV/cm. This electric field is much lower than that of the parallel copper layer carrying the same current, and thus it can be seen that the superconductor is far from normal.

Load Current Under Different Primary Current Magnitudes

For an ideal transformer, the secondary current $i_2$ is always proportional to the primary current $i_1$. However for a real transformer if the load impedance is high the output voltage may reach a limit when the secondary current cannot follow the primary current. In this section, we consider the influence of primary current magnitude on the load current, since the bridge resistance originally depends on the primary current.

Figure 19:
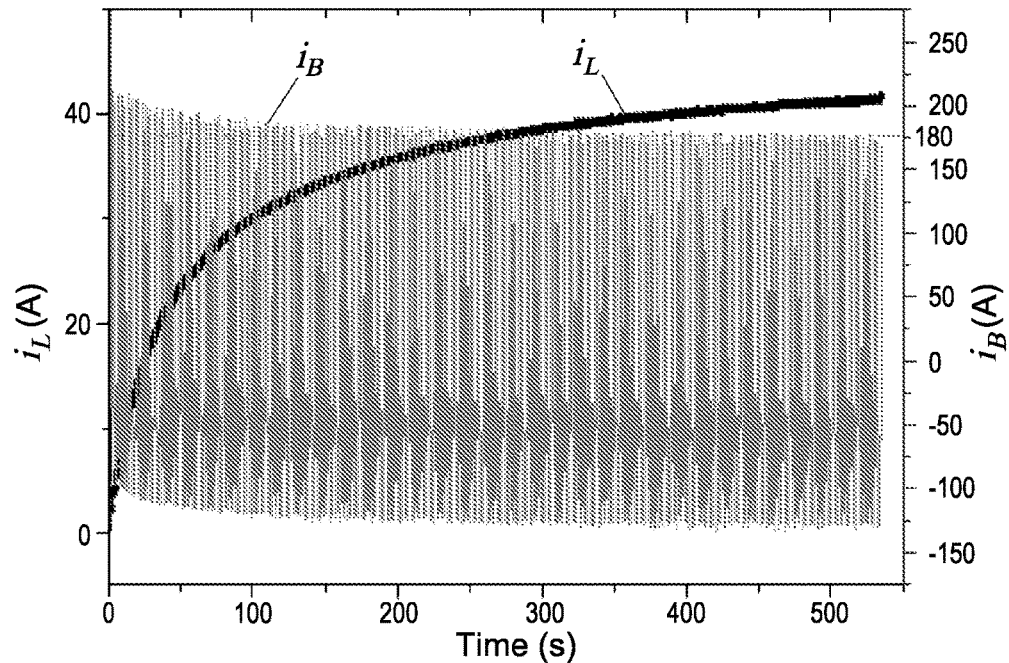
FIG. 19 shows waveforms of bridge current and load current during a charging process.

If the positive peak of primary current $I_{1pp}$ is too low for the bridge voltage to reach the limit then the secondary current is proportional to the primary current with a ratio of 100:1. FIG. 19 shows the charging curve, more particularly the waveform of bridge current $i_B$ and load current $i_L$, during the charging process. The primary current is low so that the bridge current $i_B$ reduces with increasing load current. The load current does not reach the critical current of the coil and stabilizes at a level where the positive peak value of the bridge current approximately equals the flux flow critical current of the bridge.

At the beginning of the charging process, the secondary current $i_2$ is equal to the bridge current $i_B$ because the load current $i_L$ is zero. With increasing $i_L$, $i_B$ is gradually biased in the opposite direction. In this case the bridge dc voltage drops with the increase of load current. Therefore the load current has a curve similar to a charging curve of a first order circuit. When $I_{1pp}$ is too low to drive the bridge into the flux flow region the load current tends to saturate at a value which is lower than the critical current of the load coil.

Figure 20:
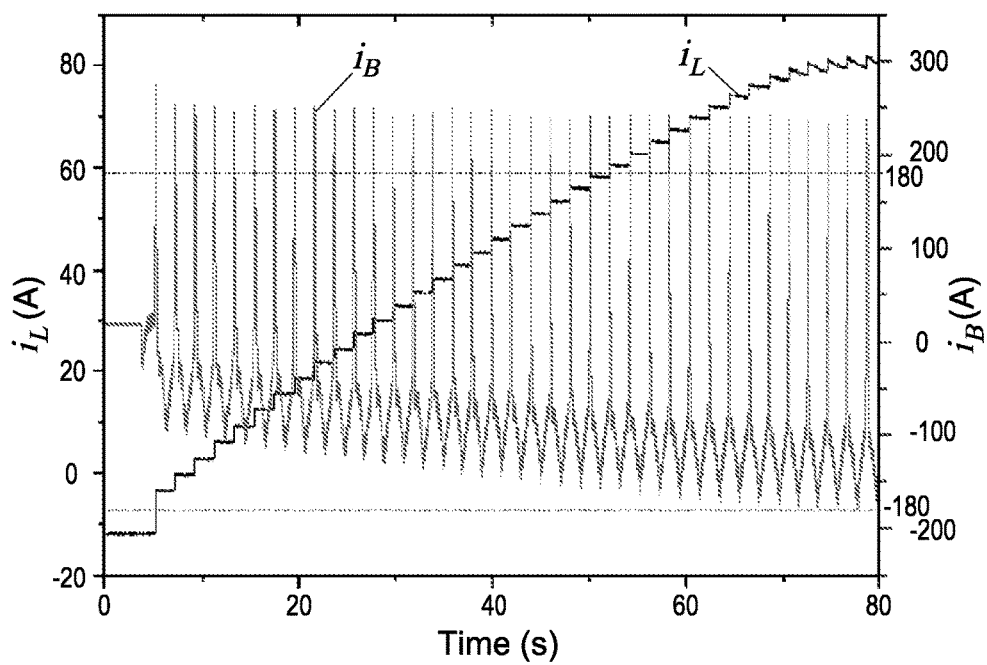
FIG. 20 shows a magnified version of waveforms of bridge current and load current during a charging process.

By contrast when the primary current level is too high the bridge voltage will reach a limit. This means that the bridge dc voltage in each cycle nearly remains constant. In this case the positive peak value of the bridge current remains substantially constant during the whole charging process, as shown in FIG. 20. In more detail, FIG. 20 shows the waveform of bridge current $i_B$ and load current $i_L$ during the charging process. The primary current is high so that the bridge voltage is limited by the capacity of the transformer during the charging process. The load current curve is nearly linear before reaching the critical current of the load coil. During each cycle the load current increases at the same rate, so the load current is nearly linear until it reaches the current of the load coil, 81 A in this example. It should be noted that no matter whether the primary current is high or low the negative peak value (the absolute value) of the bridge current will increase with the increase of the load current. In this example the load coil critical current was 81 A and the flux flow critical current of the bridge was 180 A. To ensure that the negative peak value of the bridge current does not exceed 180 A the negative peak value of the secondary current should be less than 99 A. FIG. 20 shows a case where the load current reaches the critical value, and where the negative peak value of the bridge current reaches the flux flow critical current of the bridge.

Figure 21:
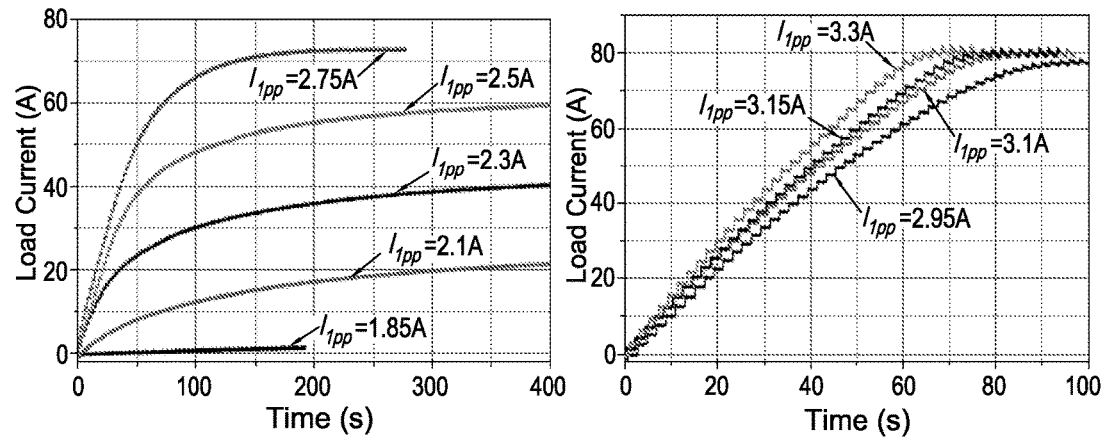
FIG. 21 shows load current curves under different primary current magnitudes.

FIG. 21 shows load current curves under different primary current magnitudes (positive peak values of primary current $I_{1pp}$). In all cases the negative peak value of the primary current $I_{1np}$ was set to be 1 A. The frequency of the primary current was 0.5 Hz.

Load Current Under Different Primary Current Frequencies

Here we discuss the frequency dependence of charging performance. During each measurement the shape of the primary current was fixed. The frequency of the primary current varied from 0.5 Hz to 16 Hz. The waveform of primary current is shown in FIG. 17, where $I_{1np}$=1 A, $I_{1pp}$=3.3 A.

Figure 22:
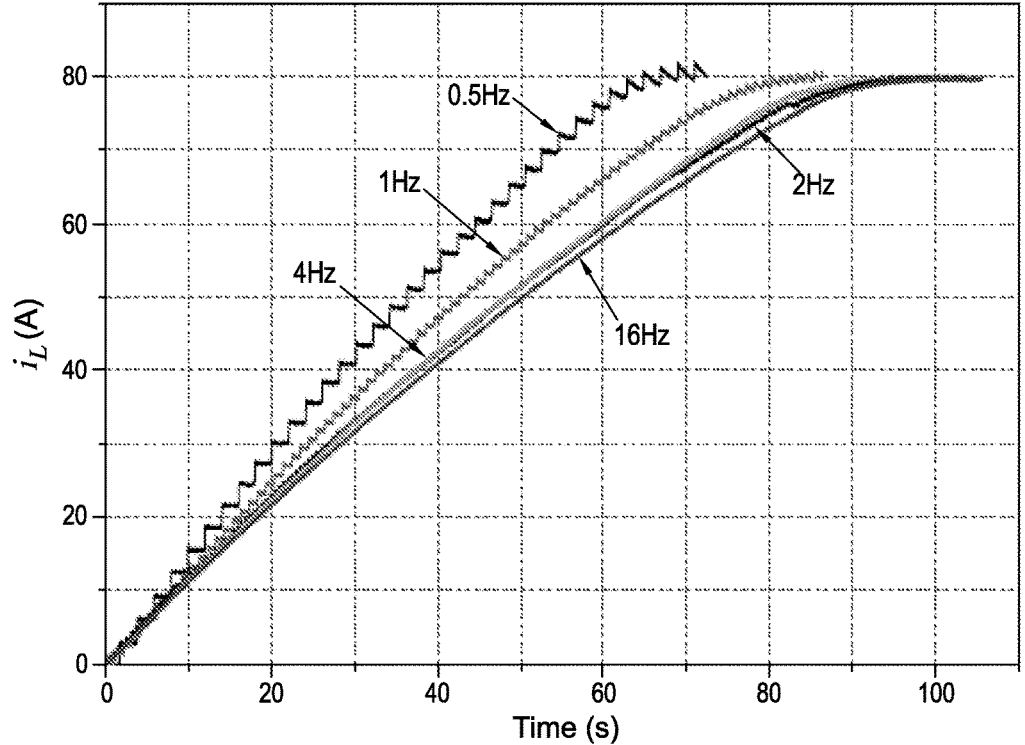
FIG. 22 shows load current curves for different frequencies of primary current.

It can be seen from FIG. 22, which shows load current curves for different frequencies of primary current, that all load currents saturate at about the critical current of the load coil, but the time to saturation differs a little. The fastest charging is with a 0.5 Hz waveform, followed by the 1 Hz case, and the remaining curves nearly overlap. Theoretically all curves should overlap if the v-i relationship of the bridge superconductor is independent of current frequency. This is because the waveforms of the primary current are the same except for the frequency, which means the amount of flux flow into the load should be the same during the same time period. However in practice, the v-i relationship of the bridge superconductor depends on temperature. The flux flow during a period P can be described as:

$$\phi=\int_0^P v(i,T)dT$$

where $\phi$ is the flux flow into the load, $v(i, T)$ denotes the instantaneous bridge voltage, which depends on the bridge current i and temperature T, and the time period P is a multiple of 2 s (the period of 0.5 Hz signal). It can be understood that a lower frequency results in a longer continuous time when the superconductor is in its flux flow region during each ac cycle, and it is therefore easier for heat to accumulate in the bridge to cause a temperature rise. (This is why the bridge superconductor cannot carry a dc current as high as the peak value of the ac current in the bridge at 77K). The temperature rise promotes flux flow and shifts the v-i curve. Therefore, at lower frequencies, the integral in the above equation for $\phi$ has a larger value, and the flux pumps faster.

Embodiments of the flux pump we have described need only a single transformer to achieve flux pumping. It is not difficult to place the primary winding and the iron core of the transformer outside the cryogenic system, and in this way losses can be significantly reduced. Embodiments of the flux pump are especially suitable for fast pumping up the current in a large magnet. The main limitation on pumping speed in this flux pump is the capacity of the transformer.

Nonetheless, because of the sharp V-I curve of the bridge superconductor it can be difficult to achieve an effective control of the bridge voltage as a small amount of noise in the bridge current can induce a large error in the bridge voltage, affecting field stability. To address this problem, a flux pump may be operated based on a combination of both flux flow resistance and dynamic resistance (induced by an applied ac magnetic field). More particularly, in embodiments of such an approach control of the superconducting bridge/connection may employ flux flow resistance (controlling the current to drive the bridge/connection into the flux flow regime) during an initial ramp up of the load current/magnetic field, and then the superconducting bridge/connection may be controlled by dynamic resistance (applied field) to regulate/stabilize the (final) field thus achieved.

Broadly speaking we have described an HTS flux pump which, in some embodiments, comprises a transformer with a superconducting secondary winding which is shorted by a piece of HTS (e.g. YBCO) coated conductor (the bridge). The transformer generates a high secondary current with a positive peak value much larger than the negative peak value. During each cycle, around the positive peak of the secondary current the bridge superconductor is driven into the (superconducting) flux flow region. During the rest of the cycle the bridge has substantially zero resistance. Flux is then accumulated in the load. The performance depends upon the primary current magnitude, and less so on the current frequency. Thus the load current can be easily charged to the critical value.

Thus some embodiments of the systems we have describe provide a HTS flux pump by driving high $T_C$ superconductor into the flux flow region of the E-J curve. Embodiments of the flux pump include a transformer which has a superconducting secondary winding shorted by an HTS (e.g. YBCO) coated conductor bridge. A (relatively large) alternating current with a (much) higher positive peak value than negative peak value is induced in the secondary winding. The current drives the bridge superconductor into the flux flow region only at around its positive peak value, thus resulting in flux pumping.

Some preferred embodiments of the above described systems use HTS, throughout (i.e. on the secondary side of the transformer). However the transformer loop does not have to be superconducting and, in principle, the bridge could employ a switchable electronic device such as a MOSFET or GAN FET. Although HTS is preferred for the transformer loop a type II superconductor could also be employed. As the skilled person will appreciate the load loop i.e. charged superconducting coil, could be any type of superconductor.

No doubt many other effective alternatives will occur to the skilled person. It will be understood that the invention is not limited to the described embodiments and encompasses modifications apparent to those skilled in the art and lying within the spirit and scope of the claims appended hereto.

The invention claimed is:

1. A superconducting circuit comprising:
   a charging loop;
   a load loop comprising a superconductor;
   a superconducting connection which is simultaneously part of said charging loop and said load loop; and
   a controller to control a state of said connection between a first conductive state and a second conductive state wherein in both said first and second states the connection is in a superconducting state, and wherein a resistance or impedance of said superconducting connection is higher in said first conductive state than in said second conductive state;
   such that said superconducting circuit is configured to induce flux flow between said charging loop and said load loop when said connection is in said first conductive state, and to inhibit flux flow between said charging loop and said load loop when said connection is in said second conductive state.

2. The superconducting circuit as claimed in claim 1, wherein said superconducting connection operates in a flux flow regime in said first conductive state.

3. The superconducting circuit as claimed in claim 1, wherein said controller is configured to cyclically control a current in said superconducting connection such that during a first portion of a current cycle the current in said superconducting connection exceeds a first threshold level whilst staying below a second threshold level to maintain said superconducting connection in a flux flow regime in said first conductive state without the superconducting connection becoming normal, and such that during a second portion of said current cycle the current in said superconducting connection is below said first threshold level to avoid said flux flow regime in said second conductive state, wherein a resistance of said superconducting connection comprises a flux flow resistance in said first conductive state and is substantially zero in said second conductive state.

4. The superconducting circuit as claimed in claim 3, wherein said controller comprises a current controller to control a waveform of said current cycle such that over a complete cycle of said current waveform a dc component of the current waveform is substantially zero.

5. The superconducting circuit as claimed in claim 1, wherein one or both of said charging loop and said load loop comprises a superconducting loop element electrically connected to said superconducting connection such that said superconducting connection bridges said superconducting loop element, and wherein joints between either end of said superconducting connection and said superconducting loop element have a finite resistance such that a non-zero dc component of said current waveform is damped to substantially zero.

6. The superconducting circuit as claimed in claim 1, wherein said controller comprises an AC magnetic field generator to generate AC magnetic field to induce dynamic resistance in said superconducting connection.

7. The superconducting circuit as claimed in claim 1, further comprising a second magnetic field generator for inducing a changing magnetic flux in said charging loop, in particular wherein said second magnetic field generator and said controller are integral to a single magnetic field generator unit.

8. The superconducting circuit as claimed in claim 1 comprising a transformer, having primary and secondary windings, wherein said charging loop forms said secondary winding of said transformer and wherein said controller comprises a controlled current generator to control a current in said primary winding of said transformer.

9. The superconducting circuit as claimed in claim 1, wherein two or more of said charging loop, said load loop and said superconducting connection are integral to a single superconducting member.

10. The superconducting circuit as claimed in claim 1, wherein said superconducting connection comprises a superconductor adjacent a magnetic material.

11. A method for controlling the magnetisation of a superconductor, the method comprising:
   providing a charging loop, a load loop comprising a superconductor and a superconducting connection which is simultaneously part of said charging loop and said load loop; and
   controlling a state of said superconducting connection between a first conductive state and a second conductive state, state wherein in both said first and second states the connection is in a superconducting state, and wherein a resistance or impedance of said superconducting connection is higher in said first conductive state than in said second conductive state;
   wherein flux flow is induced between said charging loop and said load loop when said connection is in said first conductive state, and wherein flux flow between said charging loop and said load loop is inhibited when said connection is in said second conductive state; and
   wherein said magnetisation of said superconductor is controlled by controlling said flux flow between said charging loop and said load loop.

12. The superconducting circuit as claimed in claim 11, wherein said superconducting connection operates in a flux flow regime in said first conductive state.

13. The method as claimed in claim 11, wherein said controlling comprises cyclically controlling a current in said superconducting connection such that during a first portion of a current cycle the current in said superconducting connection exceeds a first threshold level whilst staying below a second threshold level to maintain said superconducting connection in a flux flow regime in said first conductive state without the superconducting connection becoming normal, and such that during a second portion of said current cycle the current in said superconducting connection is below said first threshold level to avoid said flux flow regime in said second conductive state, wherein a resistance of said superconducting connection comprises a flux flow resistance in said first conductive state and is substantially zero in said second conductive state.

14. The method as claimed in claim 11, wherein said controlling comprises controlling a dc component of the current waveform to be substantially zero, in particular using a joint resistance between said superconducting connection and a superconducting loop element of said load loop.

15. The method as claimed in claim 11, wherein said controlling of said state of said connection comprises controlling a conductance of said connection dynamically by one or more of:
- controlling a frequency of a magnetic field applied to said connection;
- controlling a background field;
- controlling a length of said connection; and
- controlling a fraction of said connection to which a said magnetic field is applied.

16. The circuit or method as claimed in claim 11 wherein said first conductive state comprises a resistive state having a greater electrical resistance or impedance than said second conductive state.

17. A method of changing the magnetisation of a superconductor, in particular a high-temperature superconductor, the method comprising:
- providing a superconducting circuit comprising a charging loop and a superconducting load loop, wherein the charging loop and load loop share a superconducting bridge comprising part of each loop; and
- controlling an alternating (ac) current circulating in said charging loop such that during a first portion of a cycle of said ac current the superconducting bridge is driven into a flux flow regime whilst remaining superconducting, and such that during a remainder portion of said cycle the superconducting bridge is superconducting with substantially zero resistance, such that
- during each said cycle a net magnetic flux flows across said bridge into said load loop.

18. The method as claimed in claim 17 wherein said ac current in said charging loop has asymmetric positive and negative peaks and a substantially zero average value.

* * * * *